US012374264B2

(12) United States Patent
Kim et al.

(10) Patent No.: US 12,374,264 B2
(45) Date of Patent: Jul. 29, 2025

(54) LIGHT EMITTING DISPLAY DEVICE WITH A SCAN DRIVER THAT OPERATES IN FIRST MODE OR SECOND MODE

(71) Applicant: Samsung Display Co., Ltd., Yongin-Si (KR)

(72) Inventors: Jihye Kim, Yongin-si (KR); Yu-Chol Kim, Yongin-si (KR); Jin-Wook Yang, Yongin-si (KR); Seongoh Yeom, Yongin-si (KR); Eui-Myeong Cho, Yongin-si (KR); Jakyoung Jin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/239,124

(22) Filed: Aug. 29, 2023

(65) Prior Publication Data

US 2024/0153434 A1 May 9, 2024

(30) Foreign Application Priority Data

Nov. 9, 2022 (KR) ........................ 10-2022-0148546

(51) Int. Cl.
*G09G 3/20* (2006.01)

(52) U.S. Cl.
CPC ... *G09G 3/2096* (2013.01); *G09G 2300/0819* (2013.01); *G09G 2300/0852* (2013.01); *G09G 2310/0267* (2013.01); *G09G 2320/0233* (2013.01)

(58) Field of Classification Search
CPC ......... G09G 3/2096; G09G 2300/0819; G09G 2300/0852; G09G 2310/0267; G09G 2320/0233; G09G 2300/0861; G09G 2310/0251; G09G 2310/0262; G09G 2310/0286; G09G 2320/045; G09G 2340/0435; G09G 3/3233; G09G 3/32; G09G 2300/043; G09G 2300/0842; G09G 2310/08
See application file for complete search history.

(56) References Cited

U.S. PATENT DOCUMENTS

| | | | |
|---|---|---|---|
| 11,263,976 | B2 | 3/2022 | Yang et al. |
| 11,386,844 | B2 | 7/2022 | Jeon et al. |
| 11,462,172 | B2 | 10/2022 | Park et al. |

(Continued)

FOREIGN PATENT DOCUMENTS

| | | | |
|---|---|---|---|
| KR | 10-2021-0019635 | A | 2/2021 |
| KR | 10-2021-0158457 | A | 12/2021 |

*Primary Examiner* — Temesghen Ghebretinsae
*Assistant Examiner* — Ivelisse Martinez Quiles
(74) *Attorney, Agent, or Firm* — Innovation Counsel LLP

(57) ABSTRACT

Disclosed is a display device including a display panel including a pixel, a scan driver, and a driving controller that controls driving of the scan driver. The scan driver provides the pixel with a first mode scan signal having a first active period and a second active period in a first mode and provides the pixel with a second mode scan signal having a compensation active period in a second mode. The driving controller determines whether an operating frequency of the display device corresponds to one of predetermined compensation frequencies in a variable frequency mode, and operates the scan driver in the first mode or the second mode depending on a determination result of the determining.

20 Claims, 17 Drawing Sheets

(56) References Cited

U.S. PATENT DOCUMENTS

| | | | | |
|---|---|---|---|---|
| 2021/0376041 | A1* | 12/2021 | Lee | H10K 59/1213 |
| 2023/0410723 | A1* | 12/2023 | Park | G09G 3/3233 |
| 2024/0363056 | A1* | 10/2024 | Park | G09G 3/32 |
| 2024/0365607 | A1* | 10/2024 | Park | H10K 59/126 |

* cited by examiner

<First Mode>

<Second Mode>

<Second Mode>

LIGHT EMITTING DISPLAY DEVICE WITH A SCAN DRIVER THAT OPERATES IN FIRST MODE OR SECOND MODE

CROSS-REFERENCE TO RELATED APPLICATIONS

This application claims priority under 35 U.S.C. § 119 to Korean Patent Application No. 10-2022-0148546 filed on Nov. 9, 2022, in the Korean Intellectual Property Office, the disclosures of which are incorporated by reference herein in their entireties.

BACKGROUND

Embodiments of the present disclosure described herein relate to a display device, and more particularly, relate to a display device with uniform luminance characteristics.

A light emitting display device among display devices displays an image by using a light emitting diode that generates light through the recombination of electrons and holes. The light emitting display device is driven with a low power while providing a fast response speed.

The light emitting display device includes pixels connected to data lines and scan lines. Each of the pixels generally includes a light emitting diode, and a pixel circuit unit for controlling the amount of current flowing to the light emitting diode. In response to a data signal, the pixel circuit unit may control the amount of current that flows from a terminal, to which a first driving voltage is applied, to a terminal, to which a second driving voltage is applied, via the light emitting diode. In this case, light having predetermined luminance is generated to correspond to the amount of current flowing through the light emitting diode.

SUMMARY

Embodiments of the present disclosure provide a display device that is driven to have uniform luminance characteristics even when an operating frequency is varied.

According to an embodiment, a display device includes a display panel including a pixel, a scan driver, and a driving controller that controls driving of the scan driver. The scan driver provides the pixel with a first mode scan signal having a first active period and a second active period in a first mode and provides the pixel with a second mode scan signal having a compensation active period in a second mode.

The driving controller determines whether an operating frequency of the display device corresponds to one of predetermined compensation frequencies in a variable frequency mode, and operates the scan driver in the first mode or the second mode depending on the determination result.

BRIEF DESCRIPTION OF THE FIGURES

The above and other features of the present disclosure will become apparent by describing in detail embodiments thereof with reference to the accompanying drawings.

DETAILED DESCRIPTION

Figure 1:
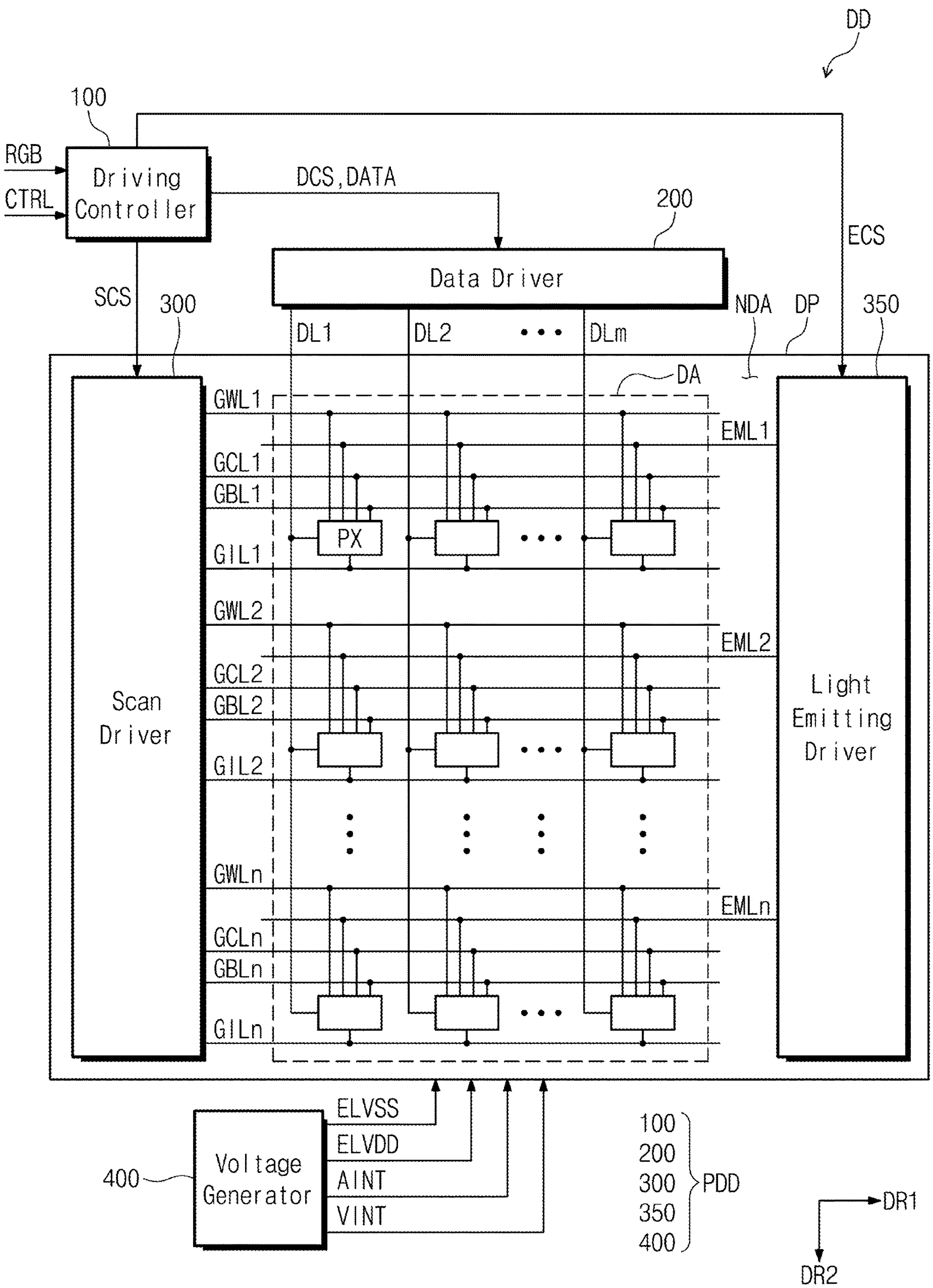
FIG. 1 is a block diagram of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component.

For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device DD, according to an embodiment of the present disclosure.

Referring to FIG. 1, the display device DD may be a device that is activated depending on an electrical signal to display an image. The display device DD may be applied to an electronic device such as a smart watch, a tablet PC, a notebook, a computer, or a smart television.

The display device DD includes a display panel DP and a panel driver PDD that drives the display panel DP. In an embodiment of the present disclosure, the panel driver PDD may include a driving controller 100, a data driver 200, a scan driver 300, a light emitting driver 350, and a voltage generator 400.

The driving controller 100 receives an image signal RGB and a control signal CTRL. The driving controller 100 generates image data DATA by converting a data format of the image signal RGB in compliance with the specification for an interface with the data driver 200. The driving controller 100 outputs a scan control signal SCS, a data control signal DCS, and an emission driving control signal ECS.

The data driver 200 receives the data control signal DCS and the image data DATA from the driving controller 100. The data driver 200 converts the image data DATA into data signals and outputs the data signals to a plurality of data lines DL1 to DLm to be described later. The data signals refer to analog data voltages corresponding to grayscale values of the image data DATA.

The voltage generator 400 generates voltages necessary to operate the display panel DP. In an embodiment of the present disclosure, the voltage generator 400 generates a first driving voltage ELVDD, a second driving voltage ELVSS, a first initialization voltage VINT, and a second initialization voltage AINT. The first and second initialization voltages VINT and AINT may have different voltage levels from each other. The voltage generator 400 generates voltages necessary to operate the display panel DP. In an embodiment of the present disclosure, the voltage generator 400 may further generate a reference voltage Vref, e.g., see FIG. 2B, supplied to the display panel DP. The reference voltage Vref may have a lower voltage level than the first driving voltage ELVDD.

The scan driver 300 receives the scan control signal SCS from the driving controller 100. The scan control signal SCS may include a start signal for starting an operation of the scan driver 300 and a plurality of clock signals. The scan driver 300 generates a plurality of scan signals and sequentially outputs the plurality of scan signals to scan lines described later. The light emitting driver 350 may output emission control signals to emission control lines EML1 to EMLn in response to the emission driving control signal ECS to be described later from the driving controller 100. In an embodiment, the scan driver 300 and the light emitting driver 350 may be integrated into one circuit.

The scan driver 300 outputs initialization scan signals to initialization scan lines GILL to GILn of the display panel DP and outputs compensation scan signals to compensation scan lines GCL1 to GCLn of the display panel DP. The scan driver 300 outputs write scan signals to the write scan lines GWL1 to GWLn of the display panel DP, and outputs black scan signals to the black scan lines GBL1 to GBLn of the display panel DP.

The display panel DP includes the initialization scan lines GIL1 to GILn, the compensation scan lines GCL1 to GCLn, the write scan lines GWL1 to GWLn, the black scan lines GBL1 to GBLn, emission control lines EML1 to EMLn, the data lines DL1 to DLm, and pixels PX. A display area DA and a non-display area NDA are defined in the display panel DP. The initialization scan lines GIL1 to GILn, the compensation scan lines GCL1 to GCLn, the write scan lines GWL1 to GWLn, the black scan lines GBL1 to GBLn, the emission control lines EML1 to EMLn, the data lines DL1 to DLm, and the pixels PX may be arranged in the display area DA. The initialization scan lines GIL1 to GILn, the compensation scan lines GCL1 to GCLn, the write scan lines GWL1 to GWLn, the black scan lines GBL1 to GBLn, and the emission control lines EML1 to EMLn extend in a first direction DR1 and are arranged spaced in a second direction DR2. The data lines DL1 to DLm extend in the second direction DR2 and are arranged spaced in the first direction DR1.

The scan driver 300 and the light emitting driver 350 may be positioned in the non-display area NDA of the display panel DP. As an example of the present disclosure, the scan driver 300 is positioned adjacent to one side of the display area DA, and the light emitting driver 350 is positioned adjacent to the other side of the display area DA opposite to the one side. In the example shown in FIG. 1, the scan driver 300 and the light emitting driver 350 are respectively positioned on opposite sides of the display area DA. However, in an embodiment, each of the scan driver 300 and the light emitting driver 350 may be positioned adjacent to one of one side and the other side of the display panel DP.

The plurality of pixels PX are electrically connected to the initialization scan lines GILL to GILn, the compensation scan lines GCL1 to GCLn, the write scan lines GWL1 to GWLn, the black scan lines GBL1 to GBLn, the emission control lines EML1 to EMLn, and the data lines DL1 to DLm. Each of the plurality of pixels PX may be electrically connected to four scan lines and one emission control line. For example, as illustrated in FIG. 1, the first row of pixels may be connected to the first initialization scan line GILL the first compensation scan line GCL1, the first write scan line GWL1, the first black scan line GBL1, and the first emission control line EML1. Moreover, the second row of pixels may be connected to the second initialization scan line GIL2, the second compensation scan line GCL2, the second write scan line GWL2, the second black scan line GBL2, and the second emission control line EML2. However, in an embodiment, the number of scan lines and the number of emission control lines may be varied.

Figure 2A:
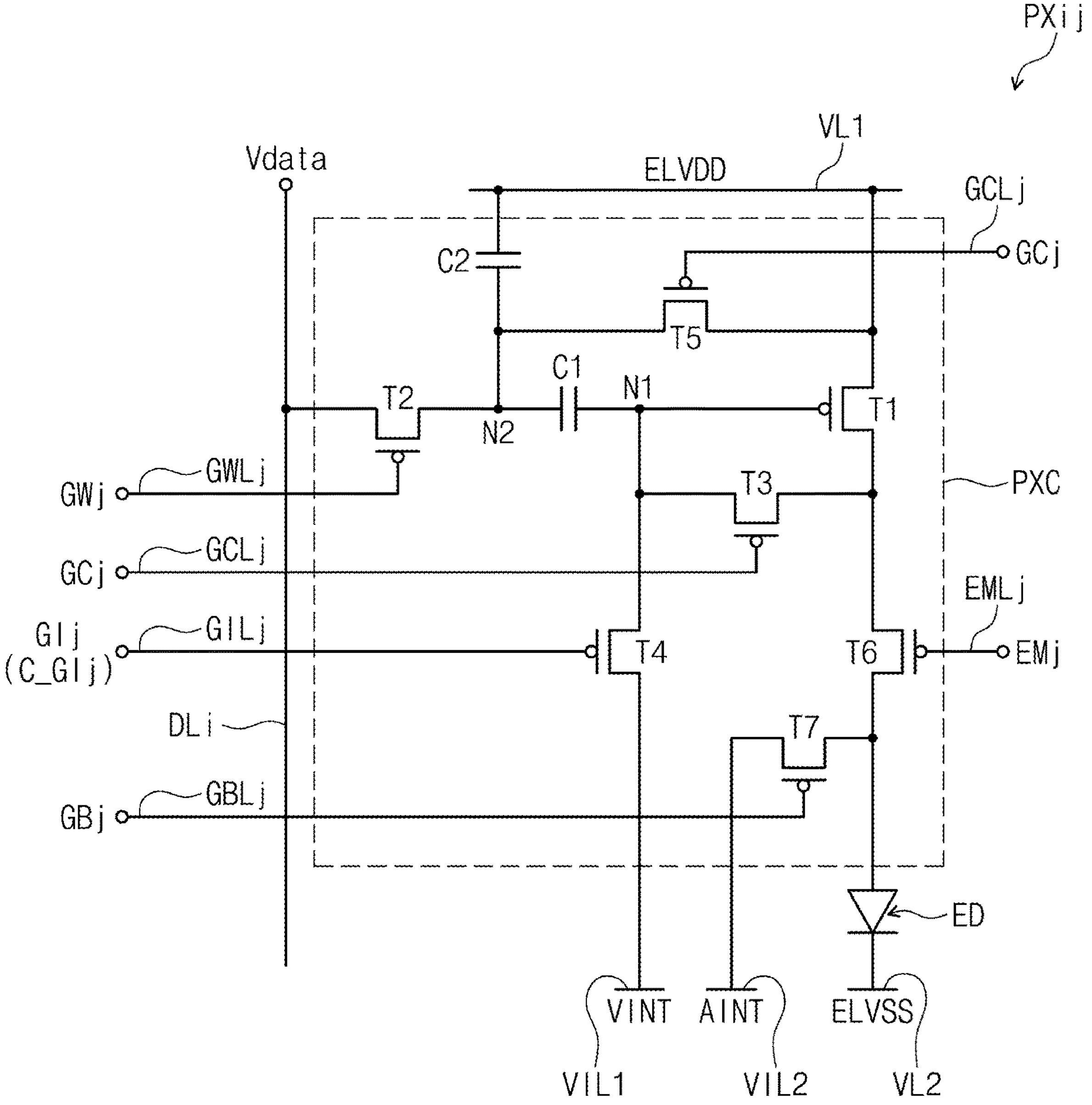
FIGS. 2A and 2B are circuit diagrams of a pixel, according to an embodiment of the present disclosure.

Each of the plurality of pixels PX includes a light emitting element ED, e.g., see FIG. 2A, and a pixel circuit unit PXC, e.g., see FIG. 2A, for controlling the emission of the light emitting element ED. The pixel circuit unit PXC may include one or more transistors and one or more capacitors. Through the same process as transistors of the pixel circuit unit PXC, the scan driver 300 and the light emitting driver 350 may be formed directly in the non-display area NDA of the display panel DP.

Each of the plurality of pixels PX receives the first driving voltage ELVDD, the second driving voltage ELVSS, the first initialization voltage VINT, and the second initialization voltage AINT from the voltage generator 400. Alternatively, each of the plurality of pixels PX may further receive the reference voltage Vref from the voltage generator 400.

Figure 2B:
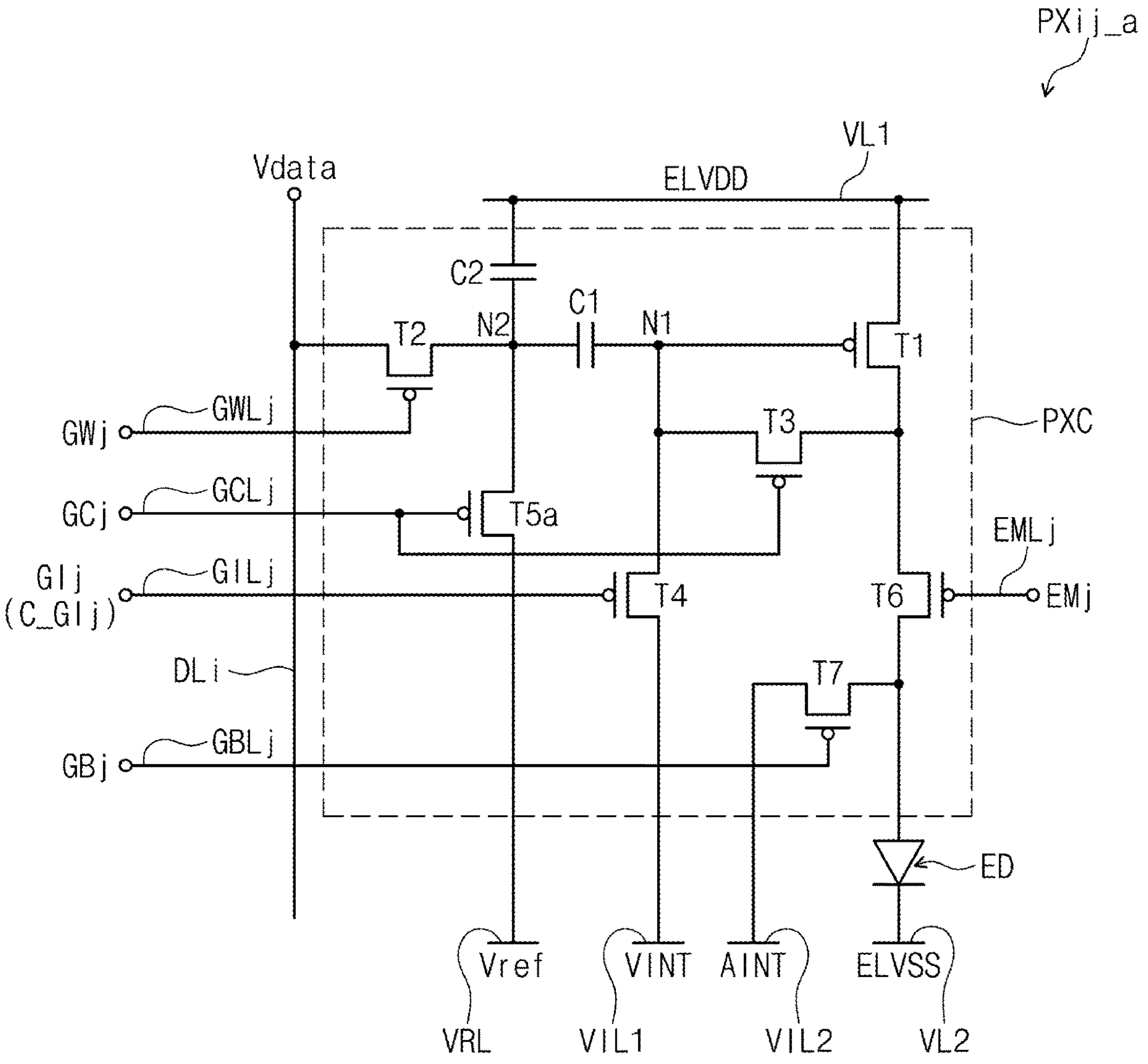

FIGS. 2A and 2B are circuit diagrams of a pixel, according to an embodiment of the present disclosure. The pixels PX shown in FIG. 1 may have the same configuration as each other. Accordingly, in FIGS. 2A and 2B, a configuration of one pixel PXij or PXij_a among the pixels PX is described, and configurations of the other pixels are omitted to avoid redundancy.

Referring to FIG. 2A, the pixel PXij is connected to a j-th initialization scan line GILj among the initialization scan lines GIL1 to GILn, a j-th compensation scan line GCLj among the compensation scan lines GCL1 to GCLn, a j-th write scan line GWLj among the write scan lines GWL1 to GWLn, and a j-th black scan line GBLj among the black scan lines GBL1 to GBLn. Moreover, the pixel PXij is connected to an i-th data line DLi among the data lines DL1 to DLm shown in FIG. 1, and is connected to a j-th emission control line EMLj among the emission control lines EML1 to EMLn.

Referring to FIG. 2A, the pixel PXij according to an embodiment includes the pixel circuit unit PXC and the light emitting element ED. In an embodiment of the present disclosure, the pixel circuit unit PXC may include seven transistors and two capacitors. Hereinafter, the seven transistors are respectively referred to as "first to seventh transistors T1, T2, T3, T4, T5, T6, and T7". The two capacitors are referred to as "first and second capacitors C1 and C2".

In an embodiment, each of the first to seventh transistors T1 to T7 is a P-type transistor having a low-temperature polycrystalline silicon (LTPS) semiconductor layer. Alternatively, each of the first to seventh transistors T1 to T7 may be N-type transistors. Moreover, at least one of the first to seventh transistors T1 to T7 may be an N-type transistor and the others of the first to seventh transistors T1 to T7 may be P-type transistors. Alternatively, at least one of the first to seventh transistors T1 to T7 may be a transistor having an oxide semiconductor layer. For example, some of the first to seventh transistors T1 to T7 may be oxide semiconductor transistors, and others of the first to seventh transistors T1 to T7 may be LTPS transistors.

The pixel PXij illustrated in FIG. 2A is only an example, and the circuit configuration of the pixel PXij may be modified and implemented.

The j-th initialization scan line GILj supplies a j-th initialization scan signal GIj or a j-th compensation initialization scan signal C_GIj to the pixel PXij. For convenience of description, in FIGS. 2A and 2B, the description will be given based on supplying the j-th initialization scan signal GIj to the j-th initialization scan line GILj.

The j-th write scan line GWLj supplies a j-th write scan signal GWj to the pixel PXij, and the j-th compensation scan line GCLj supplies a j-th compensation scan signal GCj to the pixel PXij. The j-th emission control line EMLj supplies the j-th emission control signal EMj to the pixel PXij, and the i-th data line DLi delivers an i-th data voltage Vdata to the pixel PXij. The i-th data voltage Vdata may have a voltage level corresponding to the image data DATA input to the display device DD, e.g., see FIG. 1.

The pixel PXij may be connected to a first voltage line VL1, a second voltage line VL2, and first and second initialization voltage lines VIL1 and VIL2. The first voltage line VL1 delivers the first driving voltage ELVDD supplied from the voltage generator 400 shown in FIG. 1 to the pixel PXij. The second voltage line VL2 delivers the second driving voltage ELVSS supplied from the voltage generator 400 to the pixel PXij. The first and second initialization voltage lines VIL1 and VIL2 receive the first and second initialization voltages VINT and AINT from the voltage generator 400 and deliver the first and second initialization voltages VINT and AINT to the pixel PXij, respectively.

Each of the first to seventh transistors T1 to T7 may include an input electrode (or source electrode), an output electrode (or drain electrode), and a control electrode (or gate electrode). In the present specification, for convenience of description, the input electrode, the output electrode, and the control electrode may be referred to as a "first electrode", a "second electrode", and a "third electrode".

The first transistor T1 may be provided between the first voltage line VL1 and the light emitting element ED. In detail, the first transistor T1 includes a first electrode electrically connected to the first voltage line VL1, a second electrode electrically connected to the light emitting element ED, and a third electrode connected to a first node N1. The first transistor T1 may receive the first driving voltage ELVDD through the first voltage line VL1. The second electrode of the first transistor T1 may be electrically connected to the anode of the light emitting element ED via the sixth transistor T6.

The second transistor T2 may be connected between the i-th data line DLi and a second node N2. In detail, the second transistor T2 includes a first electrode connected to the i-th data line DLi, a second electrode connected to the second node N2, and a third electrode for receiving the j-th write scan signal GWj through the j-th write scan line GWLj. During a data write period, the second transistor T2 is turned on in response to the j-th write scan signal GWj provided to the j-th write scan line GWLj. The i-th data line DLi and the second node N2 may be electrically connected by the turned-on second transistor T2. The i-th data voltage Vdata applied to the i-th data line DLi may be applied to the second node N2 through the turned-on second transistor T2.

The first capacitor C1 is connected between the first node N1 and the second node N2, and the second capacitor C2 is connected between the second node N2 and the first voltage line VL1. The first capacitor C1 includes a first electrode electrically connected to the first node N1 and a second electrode electrically connected to the second node N2. The second capacitor C2 includes a first electrode electrically connected to the first voltage line VL1 and a second electrode electrically connected to the second node N2.

The third transistor T3 is connected between the second electrode of the first transistor T1 and the third electrode of the first transistor T1. In detail, the third transistor T3 includes a first electrode electrically connected to the second electrode of the first transistor T1, a second electrode electrically connected to the first node N1, and a third electrode for receiving the j-th compensation scan signal GCj through the j-th compensation scan line GCLj. During a compensation period, the third transistor T3 is turned on in response to the j-th compensation scan signal GCj provided to the j-th compensation scan line GCLj. During the compensation period, the first transistor T1 may be diode-connected by the turned-on third transistor T3.

The fourth transistor T4 is electrically connected between the first node N1 and the first initialization voltage line VIL1 In detail, the fourth transistor T4 includes a first electrode electrically connected to the first node N1, a second electrode electrically connected to the first initialization voltage line VIL1, and a third electrode for receiving the j-th initialization scan signal GIj through the j-th initialization scan line GILj. The first initialization voltage VINT may be applied to the first initialization voltage line VIII. During an initialization period, the fourth transistor T4 is turned on in response to the j-th initialization scan signal GIj provided to the j-th initialization scan line GILj. During the initialization period, the first node N1 may be initialized to the first initialization voltage VINT by the turned-on fourth transistor T4.

The fifth transistor T5 may be electrically connected between the second node N2 and the first voltage line VL1. The fifth transistor T5 includes a first electrode connected to the first voltage line VL1, a second electrode electrically connected to the second node N2, and a third electrode for receiving the j-th compensation scan signal GCj through the j-th compensation scan line GCLj. During the compensation period, the fifth transistor T5 is turned on in response to the j-th compensation scan signal GCj provided to the j-th compensation scan line GCLj. The first voltage line VL1 and the second node N2 are electrically connected by the turned-on fifth transistor T5. That is, during the compensation period, the first driving voltage ELVDD may be applied to the second node N2.

In an embodiment of the present disclosure, the third electrodes of the third and fifth transistors T3 and T5 are commonly connected to the j-th compensation scan line GCLj. However, in an embodiment, the third electrode of the third transistor T3 and the third electrode of the fifth transistor T5 are connected to different scan lines to receive different scan signals.

The sixth transistor T6 is connected between the second electrode of the first transistor T1 and the anode of the light emitting element ED. In detail, the sixth transistor T6 includes a first electrode connected to the second electrode of the first transistor T1, a second electrode electrically connected to the anode of the light emitting element ED, and a third electrode electrically connected to the j-th emission control line EMLj. During the emission period, the sixth transistor T6 may be turned on in response to the j-th emission control signal EMj provided to the j-th emission control line EMLj.

The seventh transistor T7 is connected between the second initialization voltage line VIL2 and the anode of the light emitting element ED. The seventh transistor T7 includes a first electrode connected to the anode of the light emitting element ED, a second electrode connected to the second initialization voltage line VIL2, and a third electrode that receives the j-th black scan signal GBj through the j-th black scan line GBLj. The second initialization voltage AINT may be applied to the second initialization voltage line VIL2. In an embodiment of the present disclosure, the second initialization voltage AINT has a different voltage level from the voltage level of the first initialization voltage VINT. During a black period, the seventh transistor T7 is turned on in response to the j-th black scan signal GBj provided by the j-th black scan line GBLj. During the black period, the anode of the light emitting element ED may be initialized to the second initialization voltage AINT by the turned-on seventh transistor T7. Alternatively, the third electrode of the seventh transistor T7 may be connected to the (j+1)-th write scan line to receive the (j+1)-th write scan signal as the j-th black scan signal GBj.

The light emitting element ED may be electrically connected between the sixth transistor T6 and the second voltage line VL2. The anode of the light emitting element ED is connected to the second electrode of the sixth transistor T6, and a cathode of the light emitting element ED is connected to the second voltage line VL2. The second driving voltage ELVSS may be applied to the second voltage line VL2. The second driving voltage ELVSS has a lower level than the first driving voltage ELVDD. Accordingly, the light emitting element ED may emit light in response to a voltage corresponding to a difference between the signal transmitted through the sixth transistor T6 and the second driving voltage ELVSS.

Referring to FIG. 2B, in a pixel PXij_a according to an embodiment of the present disclosure, a fifth transistor T5*a* may be electrically connected between the second node N2 and a reference voltage line VRL. The reference voltage line VRL may receive the reference voltage Vref from the voltage generator 400 shown in FIG. 1 to supply the reference voltage Vref to the pixel PXij_a. The reference voltage Vref may have a lower voltage level than the first driving voltage ELVDD. The fifth transistor T5*a* includes a first electrode connected to the reference voltage line VRL, a second electrode electrically connected to the second node N2, and a third electrode receiving the j-th compensation scan signal GCj through the j-th compensation scan line GCLj. During the compensation period, the fifth transistor T5*a* is turned on in response to the j-th compensation scan signal GCj provided to the j-th compensation scan line GCLj. The reference voltage line VRL and the second node N2 are electrically connected by the turned-on fifth transistor T5*a*. That is, the reference voltage Vref may be applied to the second node N2 during the compensation period.

Figure 3A:
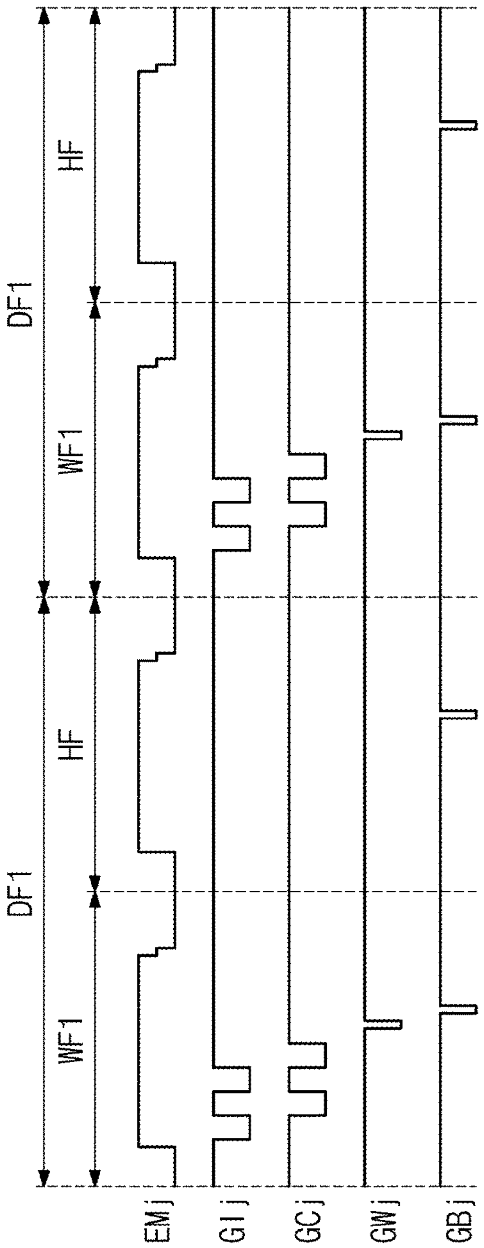
FIG. 3A is a timing diagram for describing a display device operating at a first operating frequency in a variable frequency mode, according to an embodiment of the present disclosure.
Figure 3B:
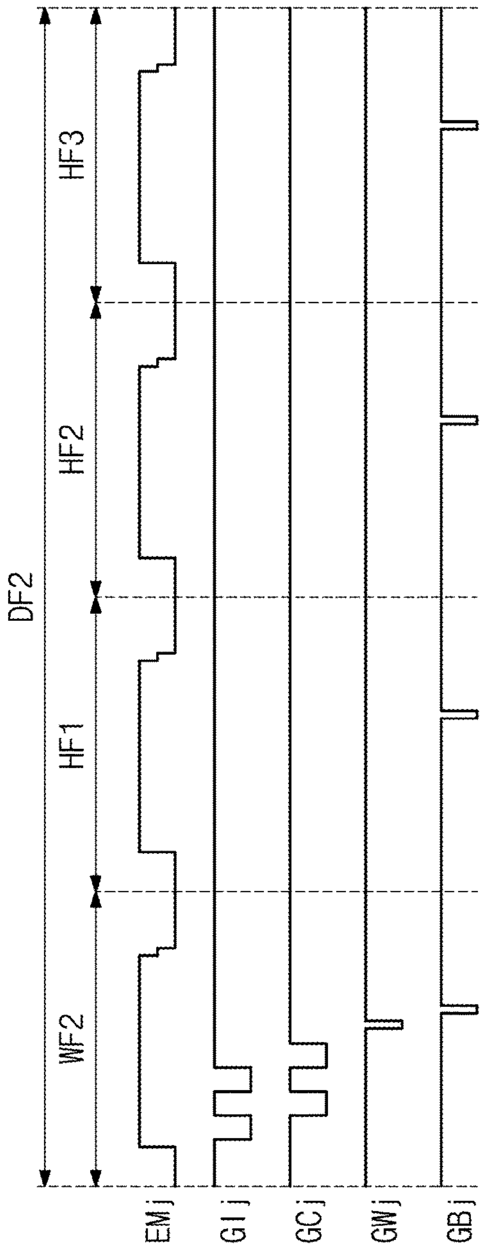
FIG. 3B is a timing diagram for describing a display device operating at a second operating frequency in a variable frequency mode, according to an embodiment of the present disclosure.

FIG. 3A is a timing diagram for describing an operation of a display device operating at a first operating frequency in a variable frequency mode, according to an embodiment of the present disclosure. FIG. 3B is a timing diagram for describing an operation of a display device operating at a second operating frequency in a variable frequency mode, according to an embodiment of the present disclosure.

Referring to FIGS. 1 and 3A, the display device DD may operate in a normal frequency mode in which an operating frequency is fixed, i.e., not variable, or may operate in a variable frequency mode in which the operating frequency is variable. In the variable frequency mode, the operating frequency may be varied according to a frame rate. FIG. 3A shows a case where the display device DD operates at a first operating frequency in a variable frequency mode. FIG. 3B shows a case where the display device DD operates at a second operating frequency in a variable frequency mode. In an embodiment of the present disclosure, the first operating frequency may be the highest operating frequency at which the display device DD is capable of operating. For example, the first operating frequency may be 240 Hz or 480 Hz. The first operating frequency may be referred to as a "reference frequency" or "maximum frequency". The second operating frequency may be lower than the first operating frequency.

As shown in FIGS. 1 and 3A, in a variable frequency mode, when the display device DD operates at the first operating frequency, the scan signals GIj, GCj, GWj, and GBj and the emission control signals EMj may be activated within the first frame DF1. In an embodiment of the present disclosure, an active period in which the scan signals GIj, GCj, GWj, and GBj and the emission control signal EMj are activated may be defined as a low level period. An inactive period in which the scan signals GIj, GCj, GWj, and GBj and the emission control signal EMj are inactivated may be defined as a high level period. In an embodiment of the present disclosure, the first frame DF1 may include a write frame WF1 and a holding frame HF. The duration of the holding frame HF may be the same as the duration of the write frame WF1. Alternatively, the first frame DF1 may include only the write frame WF1.

Some of the scan signals GIj, GCj, and GWj may be activated only in the write frame WF1 and may maintain a disable state in the holding frame HF. The scan signal GBj and the emission control signal EMj may be activated within the write frame WF1 and the holding frame HF. That is, frequencies of the scan signal GBj and the emission control signal EMj may be greater than frequencies of the scan signals GIj, GCj, and GWj.

As shown in FIGS. 1 and 3B, in the variable frequency mode, the display device DD may operate at the second operating frequency different from the first operating frequency. In an embodiment of the present disclosure, the second operating frequency may be lower than the first operating frequency. For example, the second operating frequency may be 48 Hz or 96 Hz. When the display device DD operates at the second operating frequency, the scan signals GIj, GCj, GWj, and GBj and the emission control signals EMj may be activated within the second frame DF2.

In an embodiment of the present disclosure, the second frame DF2 may include the write frame WF2 and a plurality of holding frames HF1, HF2, and HF3. The duration of the write frame WF2 may be the same as the duration of the write frame WF1. The duration of each of the plurality of holding frames HF1, HF2, and HF3 may be the same as the duration of the write frame WF2. The number of holding frames HF1, HF2, and HF3 included in the second frame DF2 may vary depending on the magnitude of the second operating frequency.

Some of the scan signals GIj, GCj, and GWj may be activated only in the write frame WF2 and may maintain a disable state in the holding frames HF1, HF2, and HF3. The scan signal GBj and the emission control signal EMj may be activated within the write frame WF2 and the holding frames HF1, HF2, and HF3. That is, frequencies of the scan signal GBj and the emission control signal EMj may be greater than frequencies of the scan signals GIj, GCj, and GWj.

Figure 4A:
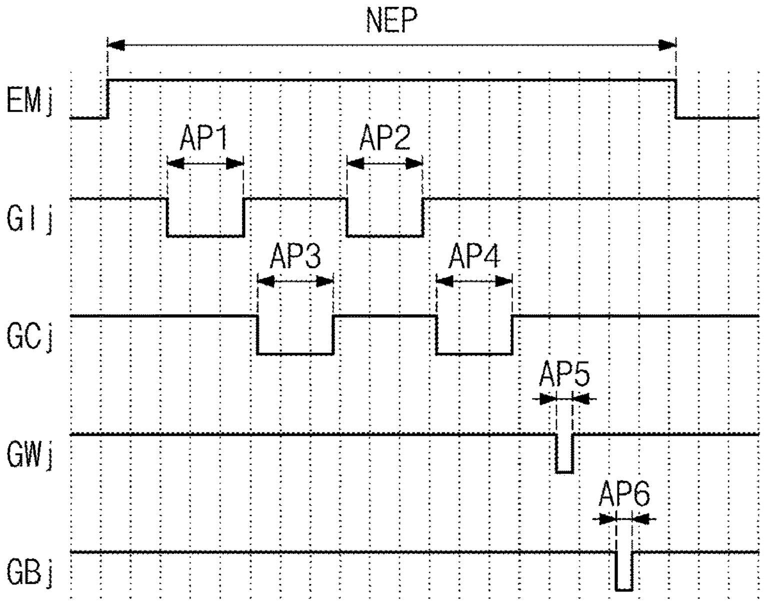
FIG. 4A is a timing diagram for describing an operation of a pixel during a non-emission period in a first mode, according to an embodiment of the present disclosure.
Figure 4B:
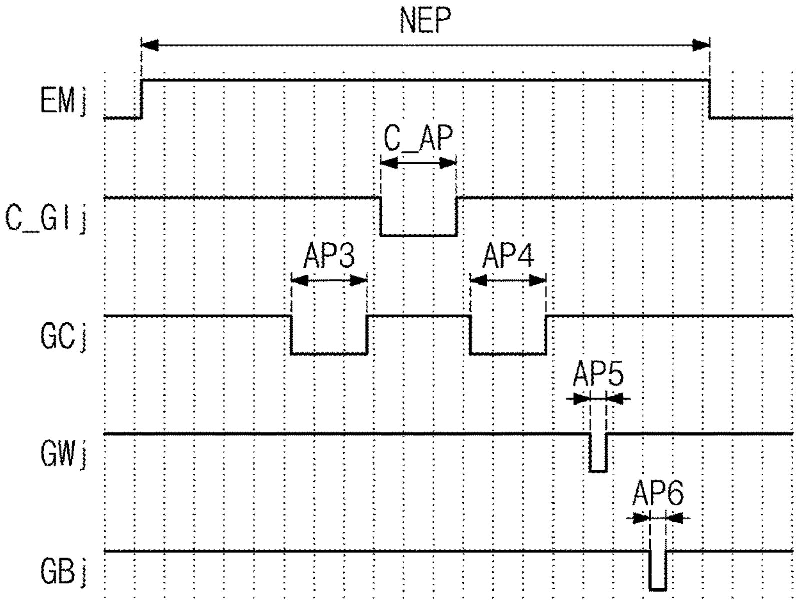
FIG. 4B is a timing diagram for describing an operation of a pixel during a non-emission period in a second mode, according to an embodiment of the present disclosure.

FIG. 4A is a timing diagram for describing an operation of a pixel during a non-emission period in a first mode, according to an embodiment of the present disclosure. FIG. 4B is a timing diagram for describing an operation of a pixel during a non-emission period in a second mode, according to an embodiment of the present disclosure. FIGS. 4A and 4B show only the j-th scan signals GIj, GCj, GWj, and GBj and the j-th emission control signal EMj. However, the remaining scan signals and the remaining emission control signals operate in the similar manner, and thus a detailed description thereof will be omitted to avoid redundancy.

Referring to FIGS. 2A, 4A, and 4B, a variable frequency mode may be divided into first and second modes in each of which one, e.g., an initialization scan signal, of the scan signals GIj, GCj, GWj, and GBj is output in a different form. That is, in the first mode, the initialization scan signal GIj (or first mode scan signal) may be generated to have first and second active periods AP1 and AP2 (or referred to as "first and second initialization periods") during a non-emission period NEP of the write frame WF1 or WF2, e.g., see FIGS. 3A and 3B. The non-emission period NEP may be defined as an inactive period, i.e., a high-level period, of the j-th emission control signal EMj. In the meantime, in the second mode, the compensation initialization scan signal C_GIj (or a second mode scan signal) may be generated to have a compensation active period C_AP, sometimes referred to as a "compensation initialization period", during the non-emission period NEP of the write frame WF1 or WF2, e.g., see FIGS. 3A and 3B. The compensation active period C_AP may correspond to one of first and second active periods AP1 and AP2.

The initialization scan signal GIj is supplied to the fourth transistor T4 through the initialization scan line GILj, and the fourth transistor T4 is turned on during the first and second active periods AP1 and AP2 in each of which the initialization scan signal GIj is activated. During the first and second active periods AP1 and AP2, the potential of the first node N1 may be initialized to the first initialization voltage VINT by the turned-on fourth transistor T4. That is, the initialization scan signal GIj includes the two active periods AP1 and AP2, and thus the first node N1 may be initialized twice within the non-emission period NEP in the first mode.

In the meantime, the compensation initialization scan signal C_GIj includes the one compensation active period C_AP, the first node N1 may be initialized once within the non-emission period NEP in the second mode.

FIG. 4B shows that the compensation active period C_AP is generated to correspond to the second active period AP2. However, in an embodiment, the compensation active period C_AP may be generated to correspond to the first active period AP1. That is, the first mode scan signal GIj may be generated to have the two active periods AP1 and AP2. On the other hand, the second mode scan signal C_GIj may be generated to have only the one compensation active period C_AP. That is, the number of active periods of the initialization scan signal GIj or C_GIj may vary depending on the mode.

As shown in FIGS. 2A, 4A, and 4B, during the non-emission period NEP of the first and second modes, the compensation scan signal GCj among the scan signals GIj, GCj, GWj, and GBj may be generated to have third and fourth active periods AP3 and AP4.

When the compensation scan signal GCj is supplied to the third and fifth transistors T3 and T5 through the compensation scan line GCLj, the third and fifth transistors T3 and T5 are turned on in the third and fourth active periods AP3 and AP4. The first transistor T1 is diode-connected by the turned-on third transistor T3 and is forward-biased. Then, a compensation voltage ("ELVDD-Vth") obtained by reducing the first driving voltage ELVDD by a threshold voltage Vth of the first transistor T1 may be applied to the first node N1. That is, in the third and fourth active periods AP3 and AP4, the potential of the first node N1 may be compensated to be the compensation voltage ("ELVDD-Vth"). During the third and fourth active periods AP3 and AP4, the first driving voltage ELVDD is applied to the second node N2 through the turned-on fifth transistor T5.

The number of active periods of the compensation scan signal GCj may be fixed without changing depending on a mode. However, in an embodiment, the number of active periods of the compensation scan signal GCj may also vary depending on a mode. That is, in the first mode, the compensation scan signal GCj includes two active periods. However, in the second mode, the compensation scan signal GCj may include only one active period.

Among the scan signals GIj, GCj, GWj, and GBj, the write scan signal GWj may be generated to have a fifth active period AP5 during the non-emission period NEP of the first and second modes, and the black scan signal GBj may be generated to have a sixth active period AP6 during the non-emission period NEP of the first and second modes.

The write scan signal GWj is supplied to the second transistor T2 through the write scan line GWLj, and then the second transistor T2 is turned on during the fifth active period AP5. The i-th data voltage Vdata may be applied to the second node N2 through the turned-on second transistor T2. Then, the potential of the second node N2 changes from the first driving voltage ELVDD to the i-th data voltage Vdata. The potential of the first node N1 is also changed by the coupling of the first capacitor C1.

The black scan signal GBj is supplied to the seventh transistor T7 through the black scan line GBLj, and then the seventh transistor T7 is turned on during the sixth active period AP6. During the sixth active period AP6, the second initialization voltage AINT may be applied to the anode of the light emitting element ED through the turned-on seventh transistor T7. Then, the anode of the light emitting element ED may be initialized to the second initialization voltage AINT.

In an embodiment of the present disclosure, the fifth active period AP5 and the sixth active period AP6 may have the same duration as each other. Besides, the duration of each of the first to fourth active periods AP1 to AP4 may be greater than or equal to the duration of each of the fifth and sixth active periods AP5 and AP6. FIGS. 4A and 4B illustrate that the duration of each of the first to fourth active periods AP1 to AP4 is three times greater than the duration of each of the fifth and sixth active periods AP5 and AP6. However, in an embodiment, the duration of each of the first to fourth active periods AP1 to AP4 may be twice or four times greater than the duration of each of the fifth and sixth active periods AP5 and AP6.

The duration of the compensation active period C_AP may be less than or equal to the duration of each of the first and second active periods AP1 and AP2. FIG. 4B illustrates that the duration of the compensation active period C_AP is the same as the duration of each of the first and second active periods AP1 and AP2. However, in an embodiment, the duration of the compensation active period C_AP may be the same as the duration of each of the fifth and sixth active periods AP5 and AP6.

The compensation active period C_AP may be positioned between the third and fourth active periods AP3 and AP4. However, in an embodiment, the compensation active period C_AP may precede the third active period AP3. The compensation active period C_AP may not overlap with the third and fourth active periods AP3 and AP4.

Figure 5A:
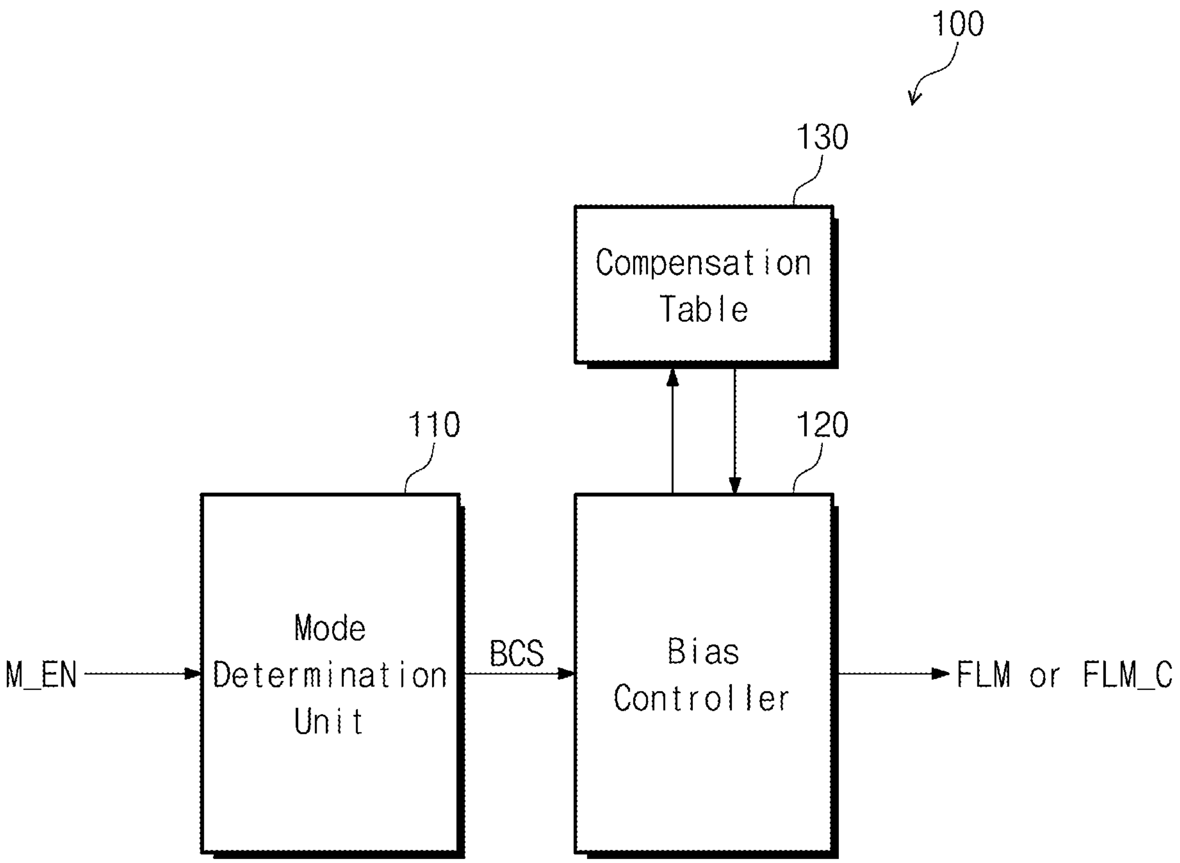
FIG. 5A is an internal block diagram of a driving controller, according to an embodiment of the present disclosure.
Figure 5B:
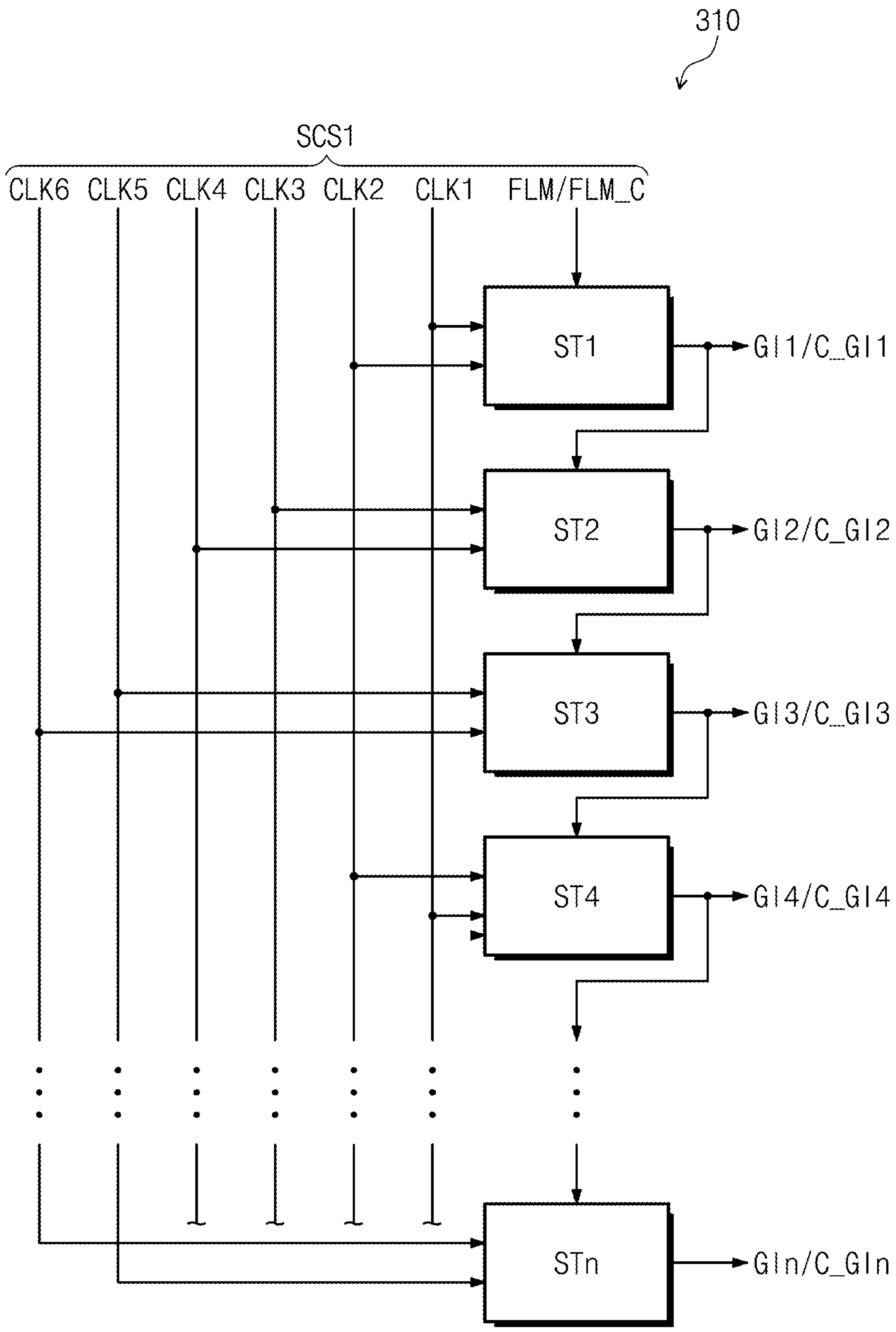
FIG. 5B is an internal block diagram of a first scan circuit, according to an embodiment of the present disclosure.
Figure 6A:
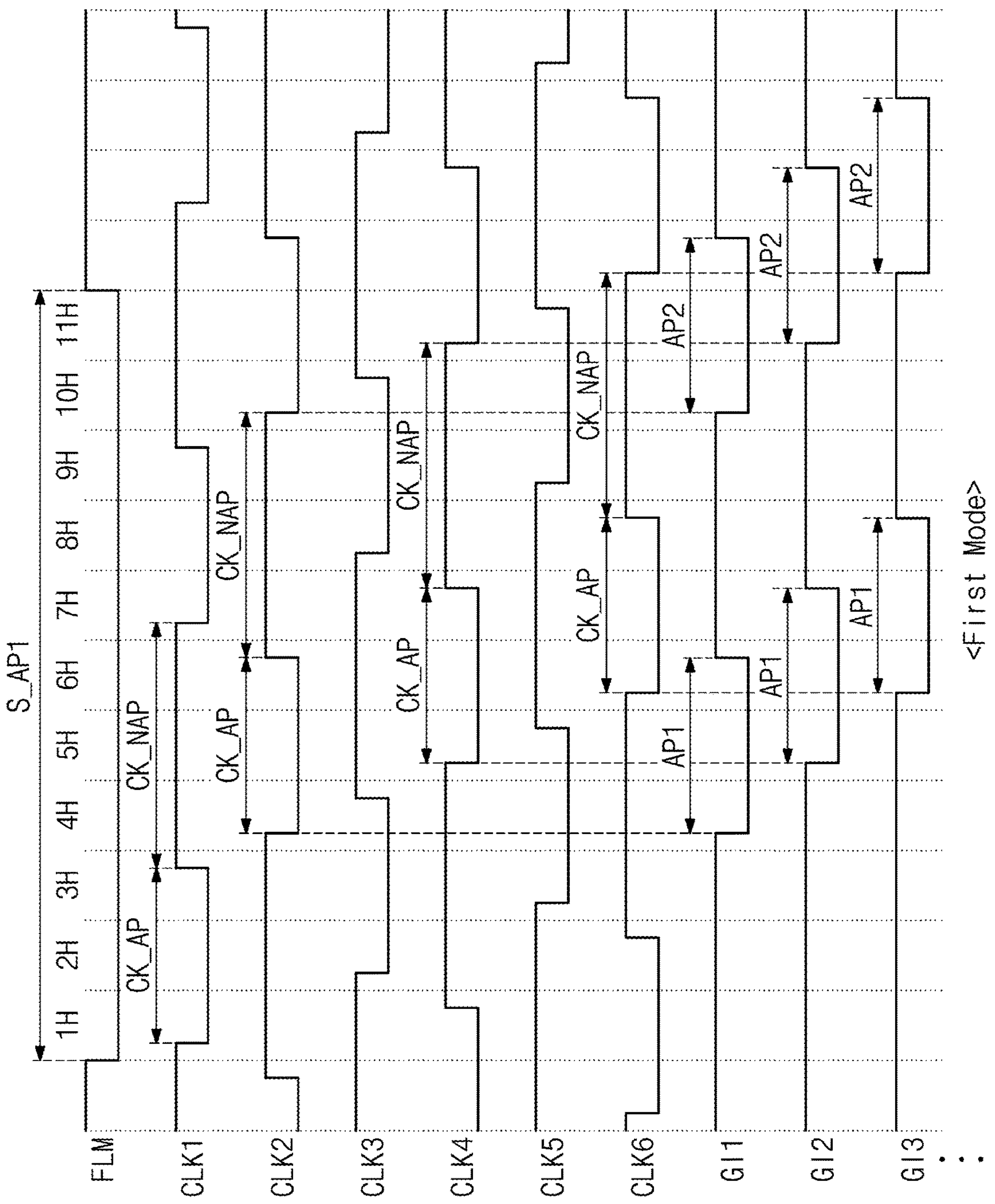
FIG. 6A is a timing diagram for describing an operation of a first scan circuit in a first mode, according to an embodiment of the present disclosure.
Figure 6B:
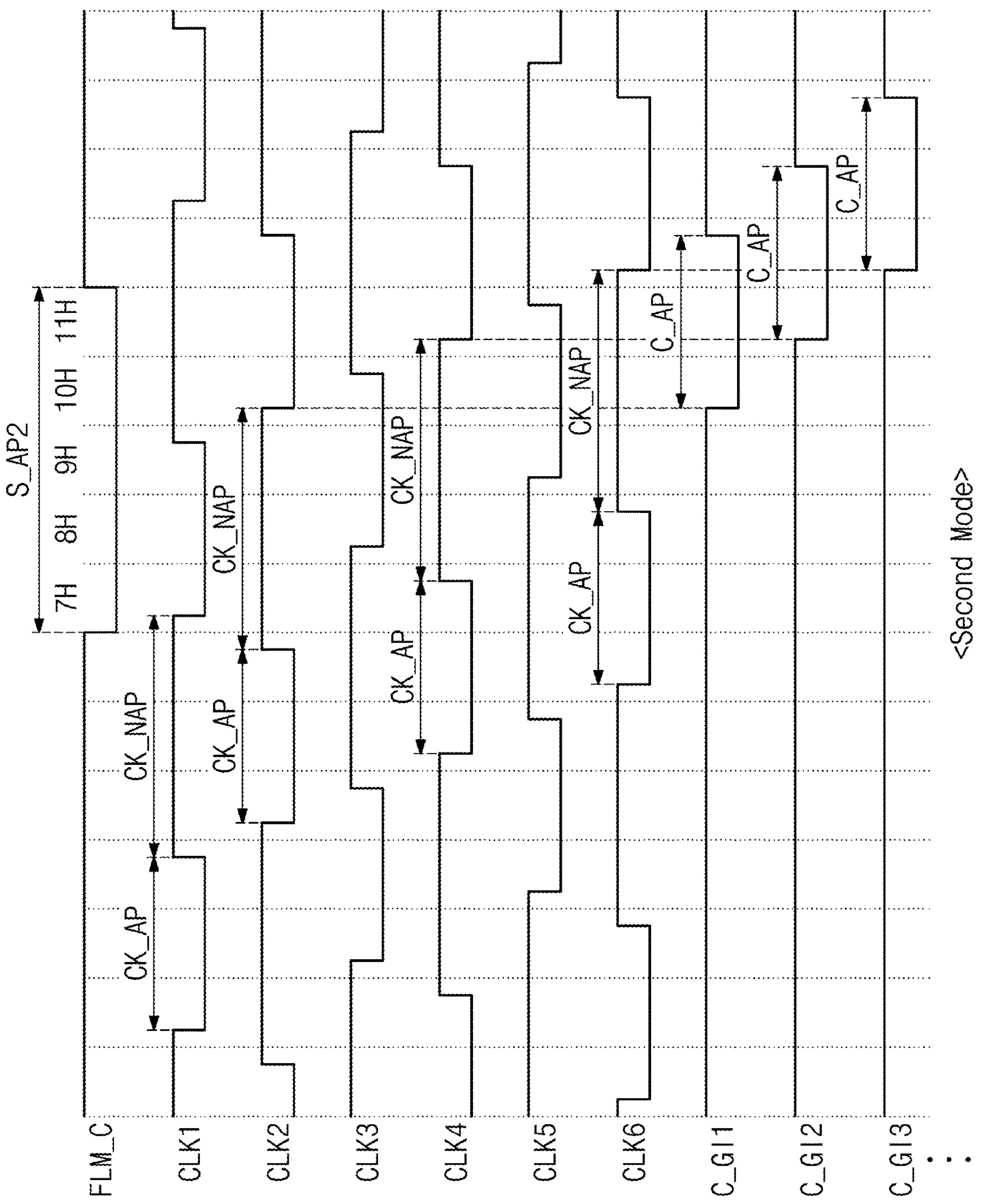
FIG. 6B is a timing diagram for describing an operation of a first scan circuit in a second mode, according to an embodiment of the present disclosure.

FIG. 5A is an internal block diagram of a driving controller 100, according to an embodiment of the present disclosure. FIG. 5B is an internal block diagram of a first scan circuit 310, according to an embodiment of the present disclosure. FIG. 6A is a timing diagram for describing an operation of a first scan circuit in a first mode, according to an embodiment of the present disclosure. FIG. 6B is a timing diagram for describing an operation of a first scan circuit in a second mode, according to an embodiment of the present disclosure.

Referring to FIG. 5A, the driving controller 100 according to an embodiment of the present disclosure may include a mode determination unit 110, a bias controller 120, and a compensation table 130.

The mode determination unit 110 determines a mode, in which the display device DD operates, from among a normal frequency mode and a variable frequency mode. The mode determination unit 110 may receive a mode enable signal M_EN provided from the outside and then may determine the normal frequency mode or the variable frequency mode. In this case, the mode enable signal M_EN may be a signal activated by a user's selection or a signal activated when a preset reference condition is satisfied. In an embodiment of the present disclosure, the mode enable signal M_EN may be a signal that is activated in the variable frequency mode and deactivated in the normal frequency mode. Alternatively, the mode determination unit 110 may determine the normal frequency mode or the variable frequency mode based on various control signals, e.g., a vertical synchronization signal, etc., required to drive the display device DD provided from the outside. The mode determination unit 110 may output a bias control signal BCS when it is determined that an operating mode is the variable frequency mode.

The bias controller 120 may receive the bias control signal BCS from the mode determination unit 110. In response to the bias control signal BCS, the bias controller 120 may be activated in the variable frequency mode and may be deactivated in the normal frequency mode. The bias controller 120 may be activated when the display device DD operates in the variable frequency mode, and may determine the current operating frequency of the display device DD. The bias controller 120 may determine the current operating frequency of the display device DD based on a vertical synchronization signal or the like.

The bias controller 120 may determine whether the current operating frequency corresponds to one of preset compensation frequencies, and may allow the scan driver 300, e.g., refer to FIG. 1, to operate in one of the first and second modes depending on a determination result of the determining whether the current operating frequency corresponds to one of preset compensation frequencies. In an embodiment of the present disclosure, the compensation frequencies may be stored in the compensation table 130. The bias controller 120 may determine whether the current operating frequency corresponds to compensation frequencies, with reference to the compensation table 130. In an embodiment of the present disclosure, the compensation frequencies may be relatively high frequencies, for example, frequencies corresponding to 240 Hz, 120 Hz, and the like.

When the current operating frequency does not match any of the compensation frequencies, i.e., when the current operating frequency is a low frequency, the bias controller 120 outputs a normal scan control signal. When the current operating frequency matches one of the plurality of compensation frequencies, i.e., when the current operating frequency is a high frequency, the bias controller 120 outputs a compensation scan control signal. In an embodiment of the present disclosure, the normal scan control signal may include a start signal FLM and a plurality of clock signals CLK1 to CLK6, e.g., see FIG. 5B. The compensation scan control signal may include a compensation start signal FLM_C and the plurality of clock signals CLK1 to CLK6.

In an embodiment of the present disclosure, the second mode may be one of a default compensation mode and an additional compensation mode. In the compensation table 130, one of the default compensation mode and the additional compensation mode for each compensation frequency may be set as the second mode. Accordingly, the bias controller 120 may operate the scan driver 300 in the default compensation mode or the additional compensation mode depending on which compensation frequency corresponds to the current operating frequency. In an embodiment of the present disclosure, the default compensation mode may be set at a lower compensation frequency than the additional compensation mode. For example, at the compensation frequency of 120 Hz, the default compensation mode may be set as the second mode. At the compensation frequencies of 240 Hz and 480 Hz, the additional compensation mode may be set as the second mode.

The compensation active period of the second mode scan signal in the additional compensation mode may have a different form from that of the compensation active period of the second mode scan signal in default compensation mode. This will be described in detail later with reference to FIGS. 9A to 10B.

Referring to FIGS. 1 and 5B, the scan driver 300 may include a plurality of scan circuits. FIG. 5B shows only a first scan circuit 310 outputting initialization scan signals GI1 to GIn among a plurality of scan circuits. The first scan circuit 310 includes driving stages ST1 to STn. Each of the driving stages ST1 to STn receives a first scan control signal SCSI shown in FIG. 5A from the driving controller 100 shown in FIG. 1. The first scan control signal SCS 1 includes the start signal FLM (or the compensation start signal FLM_C) and the first to sixth clock signals CLK1 to CLK6.

In an embodiment, the driving stages ST1 to STn output the initialization scan signals GI1 to GIn or compensation initialization scan signals C_GI1 to C_GIn. In particular, in the first mode, the driving stages ST1 to STn may output the initialization scan signals GI1 to GIn. In the second mode, the driving stages ST1 to STn may output compensation initialization scan signals C_GI1 to C_GIn.

In the first mode, the first driving stage ST1 may receive the start signal FLM as a carry signal. Each of the remaining driving stages ST2 to STn receives an initialization scan signal output from a previous driving stage as a carry signal. In the second mode, the first driving stage ST1 may receive the compensation start signal FLM_C as a carry signal. Each of the remaining driving stages ST2 to STn receives a compensation initialization scan signal output from the previous driving stage as a carry signal.

In an embodiment of the present disclosure, the first driving stage ST1 receives two clock signals, e.g., the first and second clock signals CLK1 and CLK2, among the first to sixth clock signals CLK1 to CLK6. The second driving stage ST2 receives two clock signals, e.g., the third and fourth clock signals CLK3 and CLK4, among the first to sixth clock signals CLK1 to CLK6. The third driving stage ST3 receives two clock signals, e.g., the fifth and sixth clock signals CLK5 and CLK6, among the first to sixth clock signals CLK1 to CLK6. In an embodiment of the present disclosure, a low level period of each of the first to sixth clock signals CLK1 to CLK6 is defined as a clock active period CK_AP, e.g., refer to FIG. 6A. A high level period of each of the first to sixth clock signals CLK1 to CLK6 is defined as a clock inactive period CK_NAP.

Referring to FIGS. 5B and 6A, in the first mode, the start signal FLM has a first start active period S_AP1. The first driving stage ST1 may be activated in the first start active period S_AP1 of the start signal FLM. The first driving stage ST1 may output a first initialization scan signal GI1 that starts activation at the time of the falling edge of the second clock signal CLK2 and ends the activation at the time of the rising edge of the second clock signal CLK2 within the first start active period S_AP1. The first initialization scan signal GI1 may include the first and second active periods AP1 and AP2 activated in response to the clock active period CK_AP of the second clock signal CLK2.

The second driving stage ST2 may output a second initialization scan signal GI2 that starts activation at the time of the falling edge of the fourth clock signal CLK4 and ends the activation at the time of the rising edge of the fourth clock signal CLK4 within the first and second active periods AP1 and AP2 of the first initialization scan signal GI1. The second initialization scan signal GI2 may include the first and second active periods AP1 and AP2 activated in response to the clock active period CK_AP of the fourth clock signal CLK4.

The third driving stage ST3 may output a third initialization scan signal GI3 that starts activation at the time of the falling edge of the sixth clock signal CLK6 and ends the activation at the time of the rising edge of the sixth clock signal CLK6 within the first and second active periods AP1 and AP2 of the second initialization scan signal GI2. The third initialization scan signal GI3 may include the first and second active periods AP1 and AP2 activated in response to the clock active period CK_AP of the sixth clock signal CLK6.

Referring to FIGS. 5B and 6B, in the second mode, the compensation start signal FLM_C has a second start active period S_AP2. The second start active period S_AP2 may have duration shorter than the first start active period S_AP1, e.g., refer to FIG. 6A. For example, when the first start active period S_AP1 has a period width covering 11 horizontal scan periods, i.e., first to eleventh horizontal scan period 1H to 11H, the second start active period S_AP2 may have a period width covering 5 horizontal scan periods, e.g., seventh to eleventh horizontal scan period 7H to 11H. However, in an embodiment, the second start active period S_AP2 may have a period width covering the second to sixth horizontal scan period 2H to 6H.

The first driving stage ST1 may be activated in the second start active period S_AP2 of the compensation start signal FLM_C. The first driving stage ST1 may output a first compensation initialization scan signal C_GI1 that starts activation at the time of the falling edge of the second clock signal CLK2 within the second start active period S_AP2 and ends the activation at the time of the rising edge of the second clock signal CLK2. The first compensation initialization scan signal C_GI1 may include the compensation active period C_AP activated in response to the clock active period CK_AP of the second clock signal CLK2.

The second driving stage ST2 may output a second compensation initialization scan signal C_GI2 that starts activation at the time of the falling edge of the fourth clock signal CLK4 and ends the activation at the time of the rising edge of the fourth clock signal CLK4 within the compensation active period C_AP of the first compensation initialization scan signal C_GI1. The second compensation initialization scan signal C_GI2 may include the compensation active period C_AP activated in response to the clock active period CK_AP of the fourth clock signal CLK4.

The third driving stage ST3 may output a third compensation initialization scan signal C_GI3 that starts activation at the time of the falling edge of the sixth clock signal CLK6 and ends the activation at the time of the rising edge of the sixth clock signal CLK6 within the compensation active period C_AP of the second compensation initialization scan signal C_GI2. The third compensation initialization scan signal C_GI3 may include the compensation active period C_AP activated in response to the clock active period CK_AP of the sixth clock signal CLK6.

The compensation active period C_AP of each of the first to third compensation initialization scan signal C_GI1, C_GI2, and C_GI3 may correspond to the second active period AP2 of each of the first to third initialization scan signal GI1, GI2, and GI3. However, in an embodiment, when the second start active period S_AP2 may have a period width covering the second to sixth horizontal scan period 2H to 6H, the compensation active period C_AP of each of the first to third compensation initialization scan signal C_GI1, C_GI2, and C_GI3 may correspond to the first active period AP1 of each of the first to third initialization scan signal GI1, GI2, and GI3.

As such, as the first scan circuit 310 operates in second mode during high-frequency driving and thus the first node N1, e.g., see FIG. 2A, is initialized only once, an on-bias amount of the first transistor T1, e.g., see FIG. 2A, may be relatively reduced. Accordingly, during high-frequency driving, the amount of current flowing to the light emitting element ED, e.g., see FIG. 2A, may increase in the second mode than in the first mode. Accordingly, when the second mode is entered, a small luminance difference occurs between high-frequency driving and low-frequency driving, and thus the luminance uniformity of the display device DD may be improved.

Figure 7A:
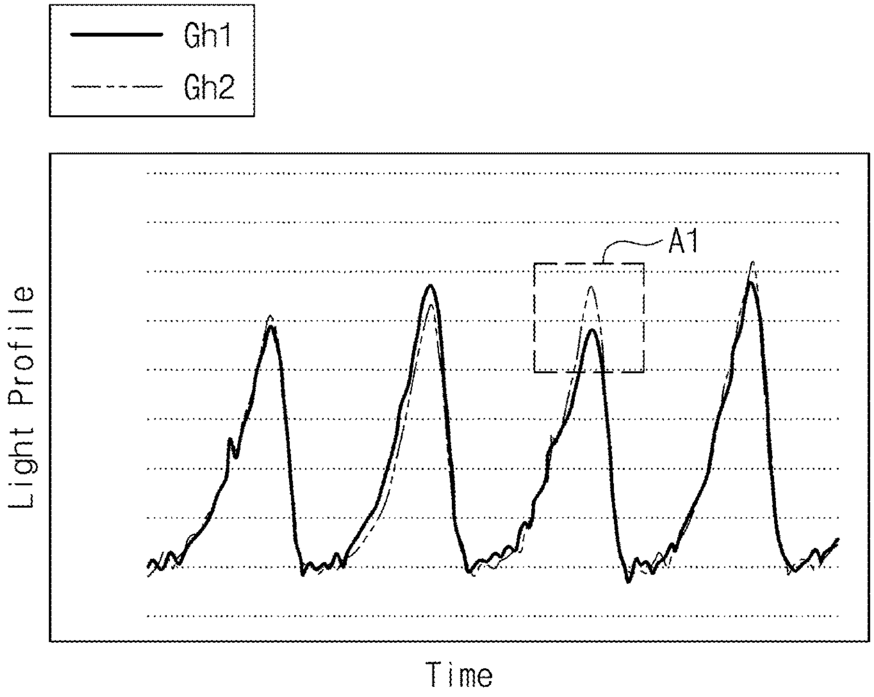
FIG. 7A is a waveform diagram showing a first light profile according to high-frequency driving and a second light profile according to low-frequency driving, which are measured in a state of not entering a second mode in a variable frequency mode.
Figure 7B:
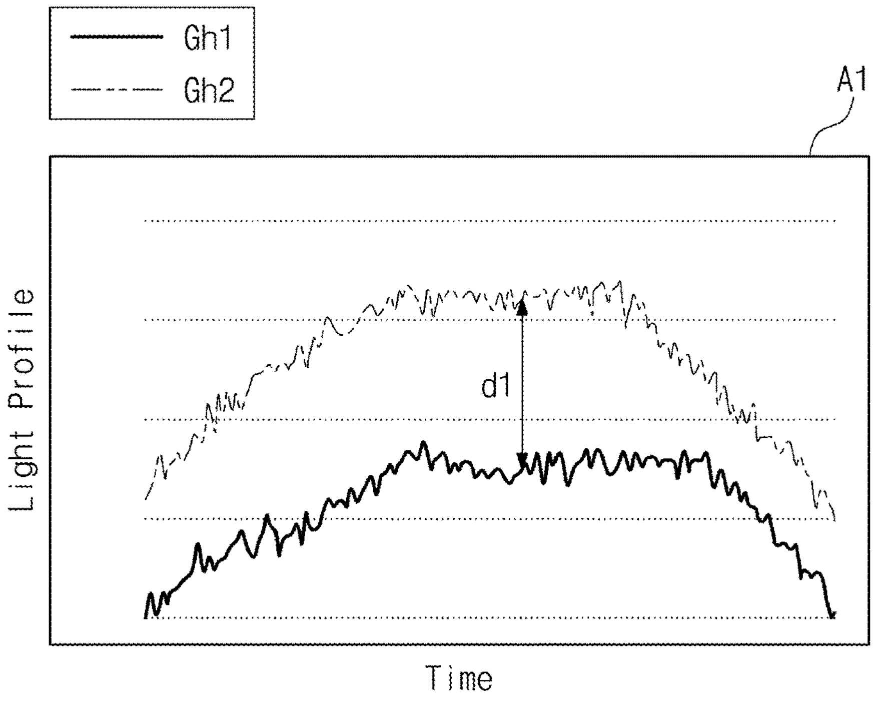
FIG. 7B is an enlarged view of a first portion A1 shown in FIG. 7A.
Figure 8A:
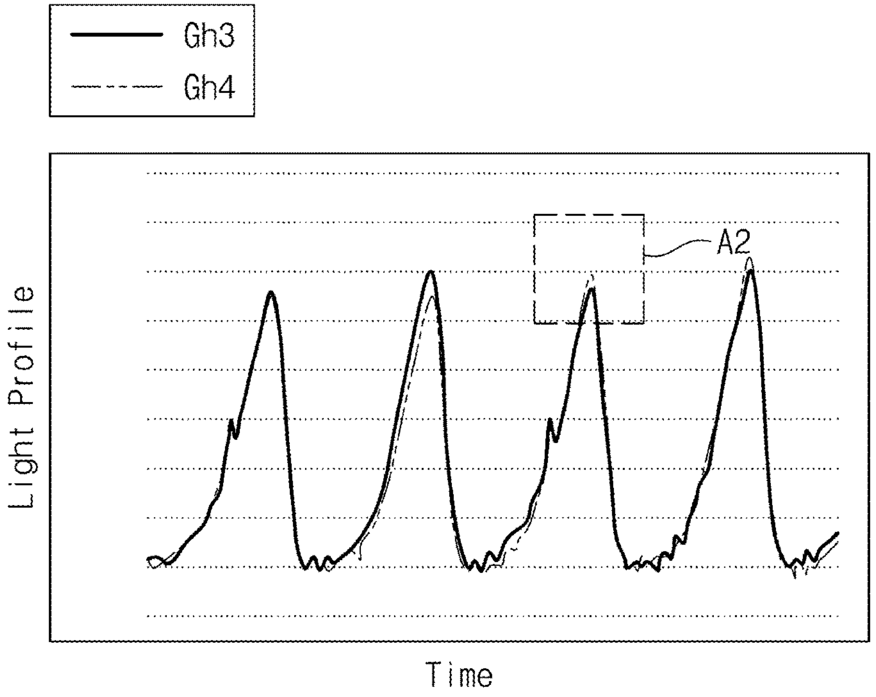
FIG. 8A is a waveform diagram showing a third light profile according to high-frequency driving and a fourth light profile according to low-frequency driving, which are measured while a second mode is entered in a variable frequency mode.
Figure 8B:
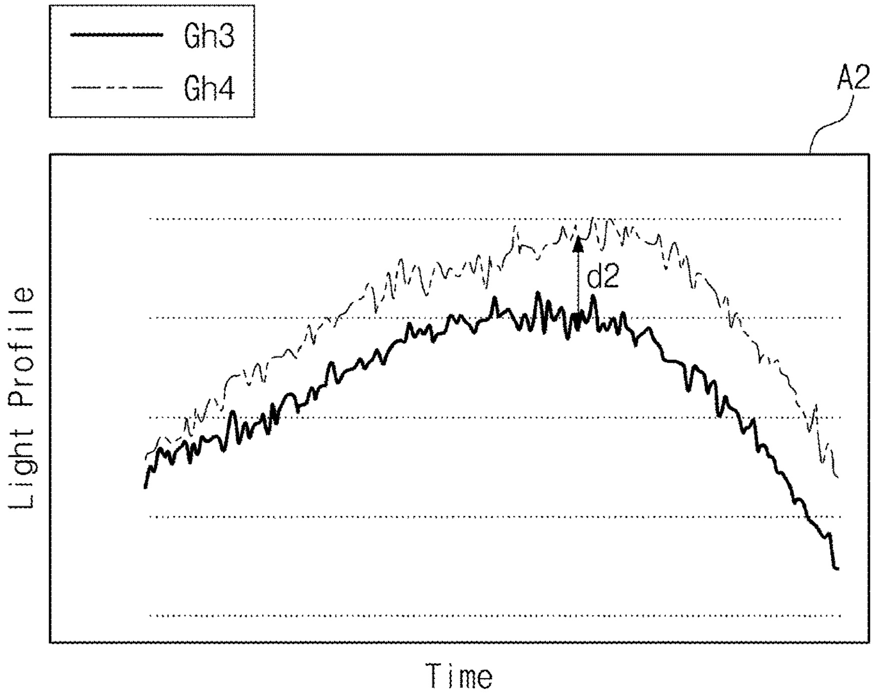
FIG. 8B is an enlarged view of a second portion A2 shown in FIG. 8A.

FIG. 7A is a waveform diagram showing a first light profile according to high-frequency driving and a second light profile according to low-frequency driving, which are measured in a state of not entering a second mode in a variable frequency mode. FIG. 7B is an enlarged view of a first portion A1 shown in FIG. 7A. FIG. 8A is a waveform diagram showing a third light profile according to high-frequency driving and a fourth light profile according to low-frequency driving, which are measured while a second mode is entered in a variable frequency mode. FIG. 8B is an enlarged view of a second portion A2 shown in FIG. 8A.

In FIG. 7A, a first graph Gh1 shows a first light profile measured during high-frequency driving in a state of not entering a second mode in a variable frequency mode, and a second graph Gh2 shows a second light profile measured during low-frequency driving in a state of not entering the second mode in the variable frequency mode. In FIG. 8A, a third graph Gh3 shows a third light profile measured during high-frequency driving in a state of entering the second mode in the variable frequency mode, and a fourth graph Gh4 shows a fourth light profile measured during low-frequency driving in a state of entering the second mode in the variable frequency mode. In particular, the first to fourth graph shows a light profile measured in a state in which the display device DD, e.g., see FIG. 1, displays a low grayscale image, e.g., 11 grayscales.

Referring to FIGS. 7A and 7B, in a case of not entering the second mode in the variable frequency mode, a first luminance difference d1 between the first light profile Gh1 and the second light profile Gh2 occurs in a first portion. Here, the first luminance difference d1 may be greater than a preset reference value. Here, not entering the second mode means that the compensation initialization scan signals C_GI1 to C_GIn are not supplied to the initialization scan lines GIL1 to GILn, but the initialization scan signals GI1 to GIn are supplied to the initialization scan lines GIL1 to GILn in the same manner as that in the first mode.

In case of not entering the second mode during low-frequency driving in the variable frequency mode, the luminance uniformity of the display device DD may be degraded due to a large luminance difference between high-frequency driving and low-frequency driving.

Referring to FIGS. 8A and 8B, in a case of entering the second mode in the variable frequency mode, a second luminance difference d2 between the third light profile Gh3 and the fourth light profile Gh4 occurs in a second portion. Here, the second luminance difference d2 may be less than a preset reference value. Here, entering the second mode means that the compensation initialization scan signals C_GI1 to C_GIn are supplied to the initialization scan lines GIL1 to GILn.

In variable frequency mode, in a case of entering the second mode during high-frequency driving, it is indicated that the luminance at high frequency increased. Issues of lowering the luminance uniformity of the display device DD due to the small luminance difference between high-frequency driving and low-frequency driving may be solved or reduced.

Figure 9A:
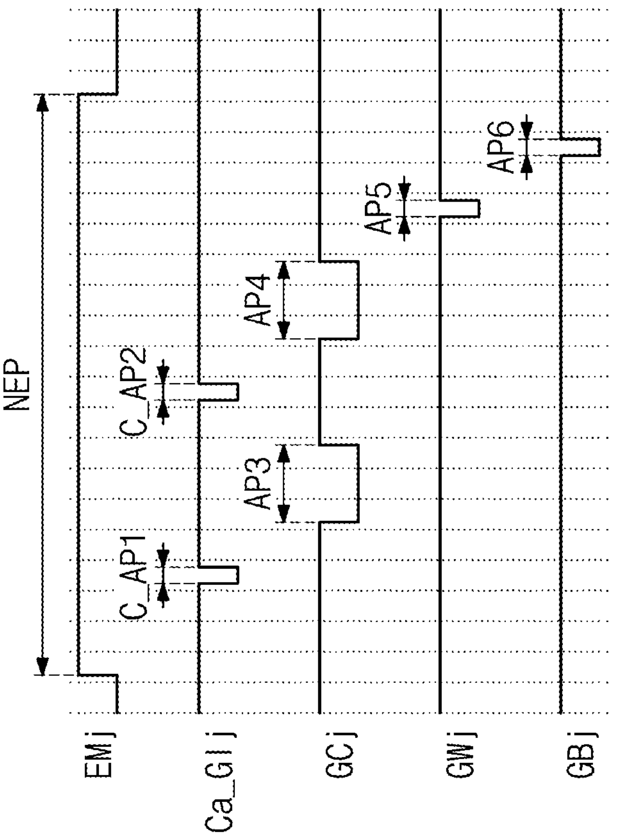
FIG. 9A is a timing diagram for describing an operation of a pixel during a non-emission period in a second mode, according to an embodiment of the present disclosure.
Figure 9B:
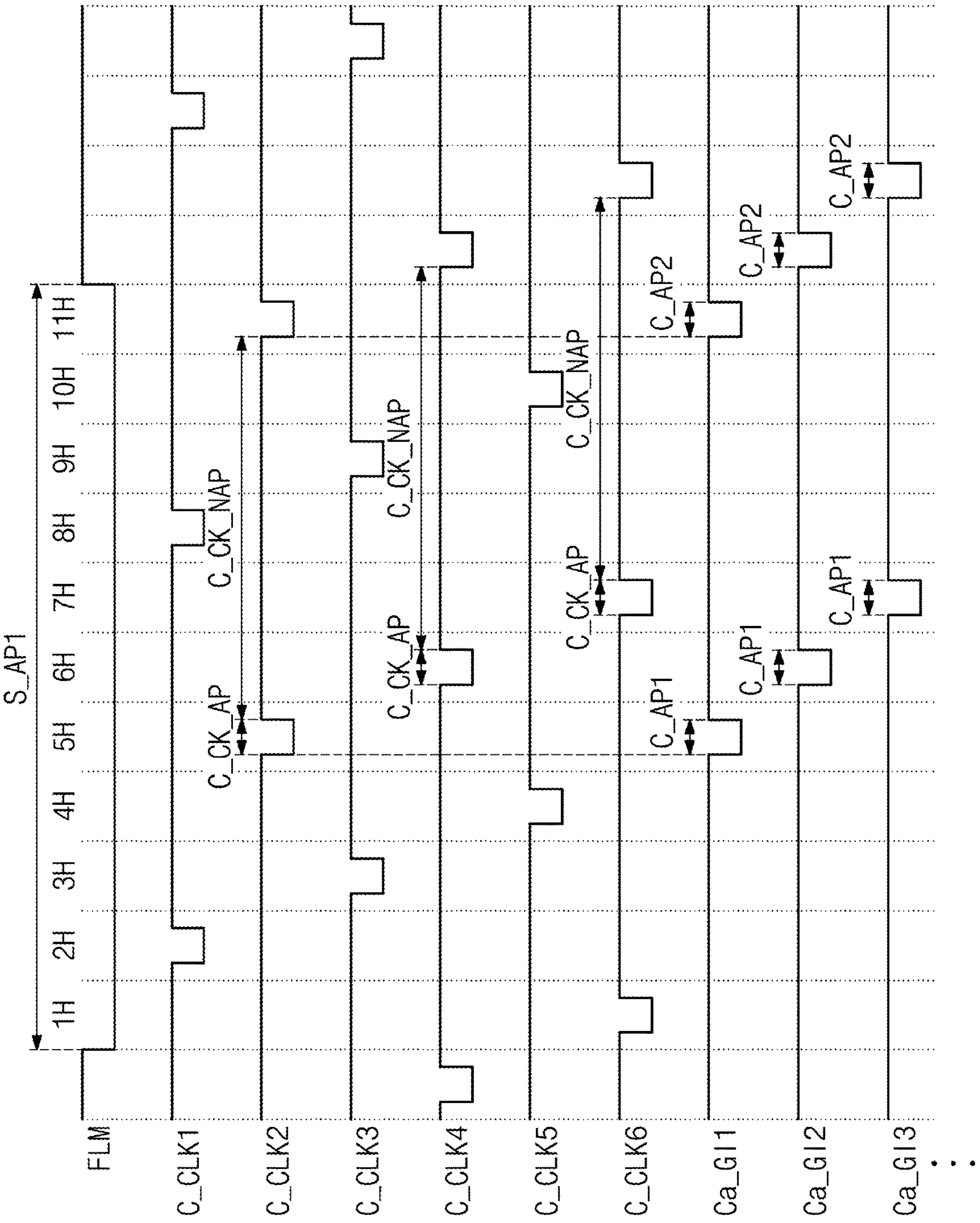
FIG. 9B is a timing diagram for describing an operation of a first scan circuit in the second mode shown in FIG. 9A.

FIG. 9A is a timing diagram for describing an operation of a pixel during a non-emission period in a second mode, according to an embodiment of the present disclosure. FIG. 9B is a timing diagram for describing an operation of a first scan circuit in the second mode shown in FIG. 9A.

Referring to FIGS. 4A, and 9A, a variable frequency mode may be divided into first and second modes in each of which one, e.g., an initialization scan signal, of the scan signals GIj, GCj, GWj, and GBj is output in a different form. That is, in the first mode, the initialization scan signal GIj (or first mode scan signal) may be generated to have first and second active periods AP1 and AP2 during the non-emission period NEP. That is, in the second mode, a compensation initialization scan signal Ca_GIj (or second mode scan signal) may be generated to have first and second compensation active periods C_AP1 and C_AP2 during the non-emission period NEP. Besides, the duration of each of the first and second compensation active periods C_AP1 and C_AP2 may be smaller than the duration of each of the first and second active periods AP1 and AP2.

In an embodiment of the present disclosure, the duration of each of the first and second compensation active periods C_AP1 and C_AP2 may correspond to ⅓ of the duration of each of the first and second active periods AP1 and AP2. However, in an embodiment, the duration of each of the first and second compensation active periods C_AP1 and C_AP2 may correspond to ½ or ⅔ of the duration of each of the first and second active periods AP1 and AP2.

FIG. 9A shows that the first and second compensation active periods C_AP1 and C_AP2 have the same duration. However, in an embodiment, the first and second compensation active periods C_AP1 and C_AP2 may have different durations from each other. For example, the first compensation active period C_AP1 may have duration shorter than the first active period AP1, and the second compensation active period C_AP2 may have the same duration as the second active period AP2. The first and second compensation active periods C_AP1 and C_AP2 may not overlap the third and fourth active periods AP3 and AP4.

Referring to FIG. 9B, in the second mode, the start signal FLM and first to sixth compensation clock signals C_CLK1 to C_CLK6 may be supplied to the first scan circuit 310, e.g., see FIG. 5B. The start signal FLM has the first start active period S_AP1. In an embodiment of the present disclosure, a low level period of each of the first to sixth compensation clock signals C_CLK1 to C_CLK6 is defined as a compensation clock active period C_CK_AP, and the high level period of each of the first to sixth compensation clock signals C_CLK1 to C_CLK6 is defined as a compensation clock inactive period C_CK_NAP. The compensation clock active period C_CK_AP may have duration shorter than the clock active period CK_AP shown in FIG. 6B, and the compensation clock inactive period C_CK_NAP may have duration shorter than the clock inactive period CK_NAP shown in FIG. 6B.

The first driving stage ST1 may be activated in the first start active period S_AP1 of the start signal FLM. The first driving stage ST1 may output a first compensation initialization scan signal Ca_GI1 that starts activation at the time of the falling edge of the second compensation clock signal C_CLK2 and ends the activation at the time of the rising edge of the compensation second clock signal C_CLK2 within the first start active period S_AP1. The first compensation initialization scan signal Ca_GI1 may include the first and second compensation active periods C_AP1 and C_AP2 activated in response to the compensation clock active period C_CK_AP of the second compensation clock signal C_CLK2.

The second driving stage ST2 may output a second compensation initialization scan signal Ca_GI2 that starts activation at the time of the falling edge of the fourth compensation clock signal C_CLK4 and ends the activation at the time of the rising edge of the fourth compensation clock signal C_CLK4 within the first and second compensation active periods C_AP1 and C_AP2 of the first compensation initialization scan signal Ca_GI1. The second compensation initialization scan signal Ca_GI2 may include the first and second compensation active periods C_AP1 and C_AP2 activated in response to the compensation clock active period C_CK_AP of the fourth compensation clock signal C_CLK4.

The third driving stage ST3 may output a third compensation initialization scan signal Ca_GI3 that starts activation at the time of the falling edge of the sixth compensation clock signal C_CLK6 and ends the activation at the time of the rising edge of the sixth compensation clock signal C_CLK6 within the first and second compensation active periods C_AP1 and C_AP2 of the second compensation initialization scan signal Ca_GI2. The third compensation initialization scan signal Ca_GI3 may include the first and second compensation active periods C_AP1 and C_AP2 activated in response to the compensation clock active period C_CK_AP of the sixth compensation clock signal C_CLK6.

Referring to FIGS. 5A and 9B, when the current operating frequency matches one of a plurality of compensation frequencies, the bias controller 120 may output a compensation scan control signal. In an embodiment of the present disclosure, the compensation scan control signal may include the start signal FLM_C and the plurality of compensation clock signals CLK1 to CLK6.

In an embodiment of the present disclosure, when the scan driver 300 operates in a default compensation mode, the scan driver 300 may output the compensation initialization scan signals C_GI1 to C_GI3 shown in FIG. 6B. On the other hand, when the scan driver 300 operates in an additional compensation mode, the scan driver 300 may output the compensation initialization scan signal Ca_GI1 to Ca_GI3 shown in FIGS. 9A and 9B.

The first and second compensation active periods C_AP1 and C_AP2 of each of the compensation initialization scan signal Ca_GI1 to Ca_GI3 in the additional compensation mode may have a different form from that of the compensation active period C_AP of each of the compensation initialization scan signals C_GI1 to C_GI3 in the default compensation mode. In an embodiment of the present disclosure, an operating frequency for operating in the default compensation mode may be lower than an operating frequency for operating in the additional compensation mode.

In the case of operating in additional compensation mode, the on-bias amount of the first transistor T1, e.g., see FIG. 2A, is further reduced than in the default compensation mode, and thus the amount of current of the light emitting element ED, e.g., see FIG. 2A, may be further increased during high-frequency driving. Accordingly, a small luminance difference occurs between high-frequency driving and low-frequency driving, and thus the luminance uniformity of the display device DD may be improved.

Figure 10A:
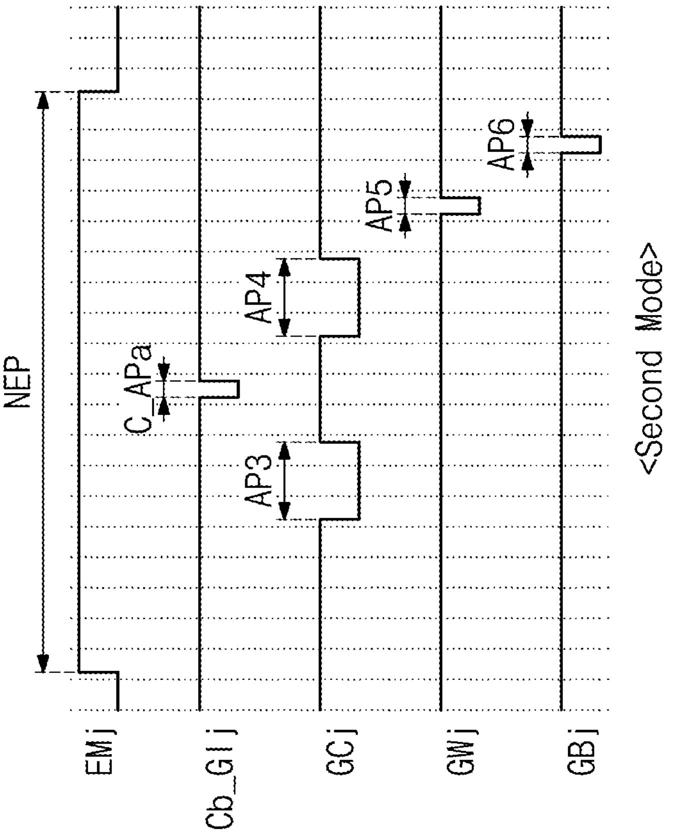
FIG. 10A is a timing diagram for describing an operation of a pixel during a non-emission period in a second mode, according to an embodiment of the present disclosure.
Figure 10B:
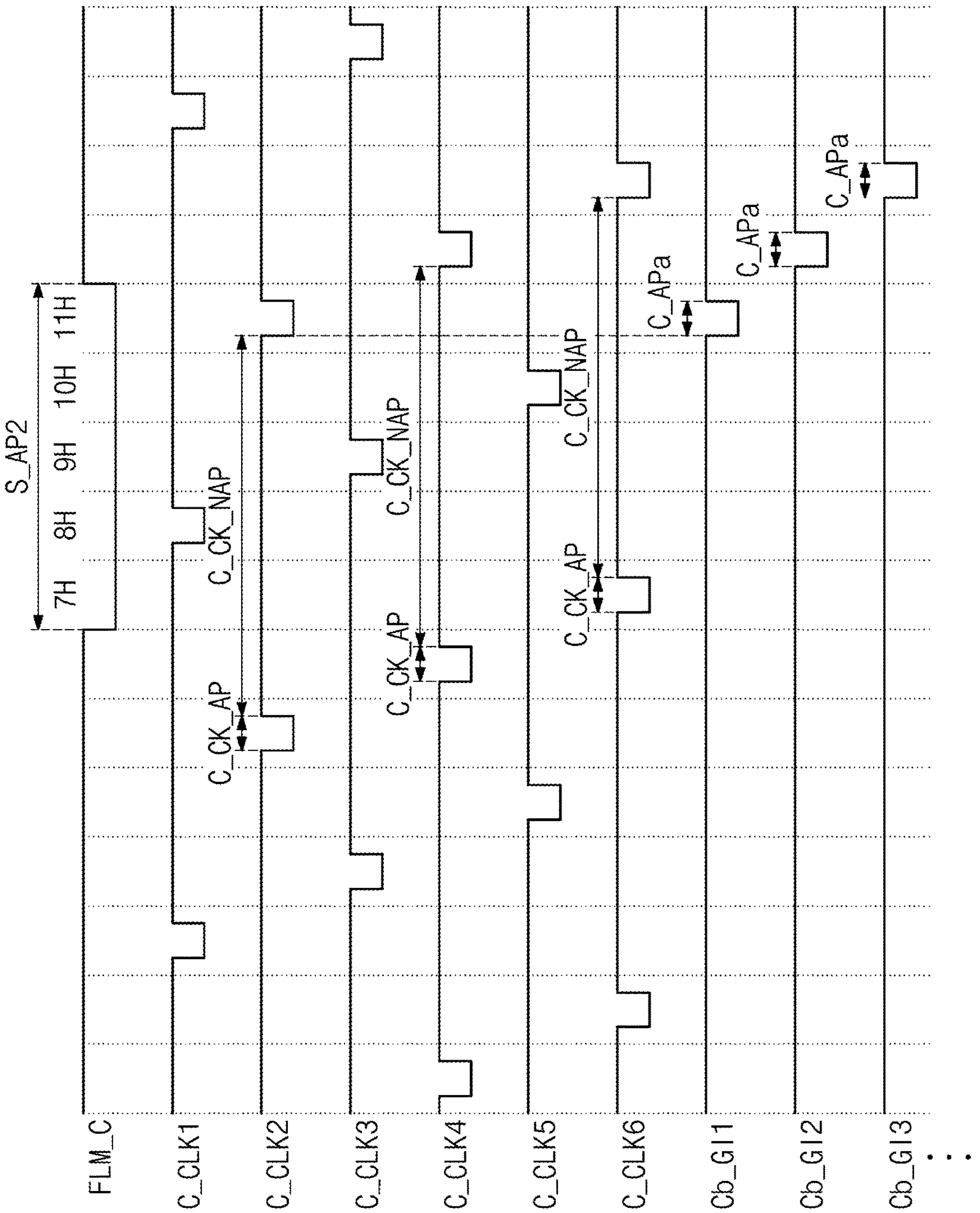
FIG. 10B is a timing diagram for describing an operation of a first scan circuit in the second mode shown in FIG. 10A.

FIG. 10A is a timing diagram for describing an operation of a pixel during a non-emission period in a second mode, according to an embodiment of the present disclosure. FIG. 10B is a timing diagram for describing an operation of a first scan circuit in the second mode shown in FIG. 10A.

Referring to FIGS. 4A, and 10A, a variable frequency mode may be divided into first and second modes in each of which one, e.g., an initialization scan signal, of the scan signals GIj, GCj, GWj, and GBj is output in a different form. That is, in the first mode, the initialization scan signal GIj (or first mode scan signal) may be generated to have first and second active periods AP1 and AP2 during the non-emission period NEP. In the meantime, in the second mode, an initialization scan signal, hereinafter referred to as a "second mode scan signal Cb_GIj", may be generated to have a compensation active period C_APa during the non-emission period NEP. The duration of the compensation active period C_APa may be less than the duration of each of the first and second active periods AP1 and AP2.

In an embodiment of the present disclosure, the duration of the compensation active period C_APa may correspond to ⅓ of the duration of each of the first and second active periods AP1 and AP2. However, in an embodiment, the duration of the compensation active period C_APa may correspond to ½ or ⅔ of the duration of each of the first and second active periods AP1 and AP2.

FIG. 10A shows that the compensation active period C_APa is located between the third and fourth active periods AP3 and AP4. However, in an embodiment, the compensation active period C_APa may occur at a location preceding the third active period AP3. The compensation active period C_APa may not overlap with the third and fourth active periods AP3 and AP4.

Referring to FIG. 10B, in the second mode, the compensation start signal FLM_C and first to sixth compensation clock signals C_CLK1 to C_CLK6 may be supplied to the first scan circuit 310, e.g., see FIG. 5B. The compensation start signal FLM_C has the second start active period S_AP2. The second start active period S_AP2 may have duration shorter than the first start active period S_AP1 illustrated in FIG. 6A. In an embodiment of the present disclosure, a low level period of each of the first to sixth compensation clock signals C_CLK1 to C_CLK6 is defined as a compensation clock active period C_CK_AP, and the high level period of each of the first to sixth compensation clock signals C_CLK1 to C_CLK6 is defined as a compensation clock inactive period C_CK_NAP. The compensation clock active period C_CK_AP may have a width shorter than the clock active period CK_AP shown in FIG. 6B, and the compensation clock inactive period C_CK_NAP may have a width shorter than the clock inactive period CK_NAP shown in FIG. 6B.

The first driving stage ST1 may be activated in the second start active period S_AP2 of the compensation start signal FLM_C. The first driving stage ST1 may output a first compensation initialization scan signal Cb_GI1 that starts activation at the time of the falling edge of the second compensation clock signal C_CLK2 and ends the activation at the time of the rising edge of the compensation second clock signal C_CLK2 within the first start active period S_AP2. The first compensation initialization scan signal Cb_GI1 may include a compensation active period C_APa activated in response to the compensation clock active period C_CK_AP of the second compensation clock signal C_CLK2.

The second driving stage ST2 may output a second compensation initialization scan signal Cb_GI2 that starts activation at the time of the falling edge of the fourth compensation clock signal C_CLK4 and ends the activation at the time of the rising edge of the fourth compensation clock signal C_CLK4 within the compensation active period C_APa of the first compensation initialization scan signal Cb_GI1. The second compensation initialization scan signal Cb_GI2 may include a compensation active period C_APa activated in response to the compensation clock active period C_CK_AP of the fourth compensation clock signal C_CLK4.

The third driving stage ST3 may output a third compensation initialization scan signal Cb_GI3 that starts activation at the time of the falling edge of the sixth compensation clock signal C_CLK6 and ends the activation at the time of the rising edge of the sixth compensation clock signal C_CLK6 within the compensation active period C_APa of the second compensation initialization scan signal Cb_GI2. The third compensation initialization scan signal Cb_GI3 may include a compensation active period C_APa activated in response to the compensation clock active period C_CK_AP of the sixth compensation clock signal C_CLK6.

In an embodiment of the present disclosure, when the scan driver 300 operates in a default compensation mode, the scan driver 300 may output the compensation initialization scan signals C_GI1 to C_GI3 shown in FIG. 6B. On the other hand, when the scan driver 300 operates in an additional compensation mode, the scan driver 300 may output the compensation initialization scan signal Cb_GI1 to Cb_GI3 shown in FIGS. 10A and 10B.

The compensation active period C_APa of each of the compensation initialization scan signal Cb_GI1 to Cb_GI3 in the additional compensation mode may have a different form from that of the compensation active period C_AP of each of the compensation initialization scan signals C_GI1 to C_GI3 in the default compensation mode. In an embodiment of the present disclosure, an operating frequency for operating in the default compensation mode may be lower than an operating frequency for operating in the additional compensation mode. In the case of operating in additional compensation mode, the on-bias amount of the first transistor T1, e.g., see FIG. 2A, is further reduced than in the default compensation mode, and thus the amount of current of the light emitting element ED, e.g., see FIG. 2A, may be further increased during high-frequency driving. Accordingly, a small luminance difference occurs between high-frequency driving and low-frequency driving, and thus the luminance uniformity of the display device DD may be improved.

Figure 11A:
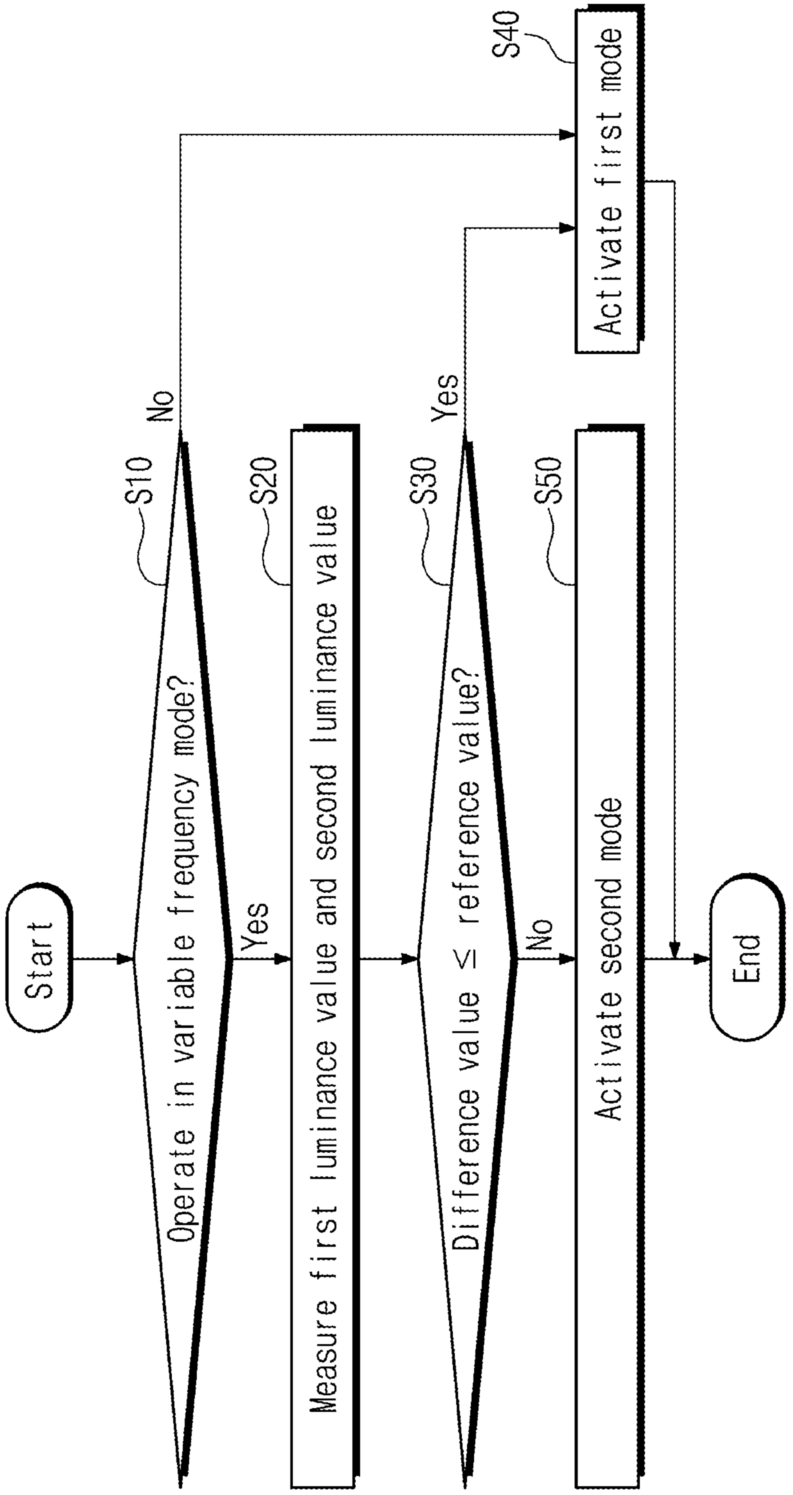
FIGS. 11A and 11B are flowcharts for describing a test process of a display device, according to embodiments of the present disclosure.
Figure 11B:
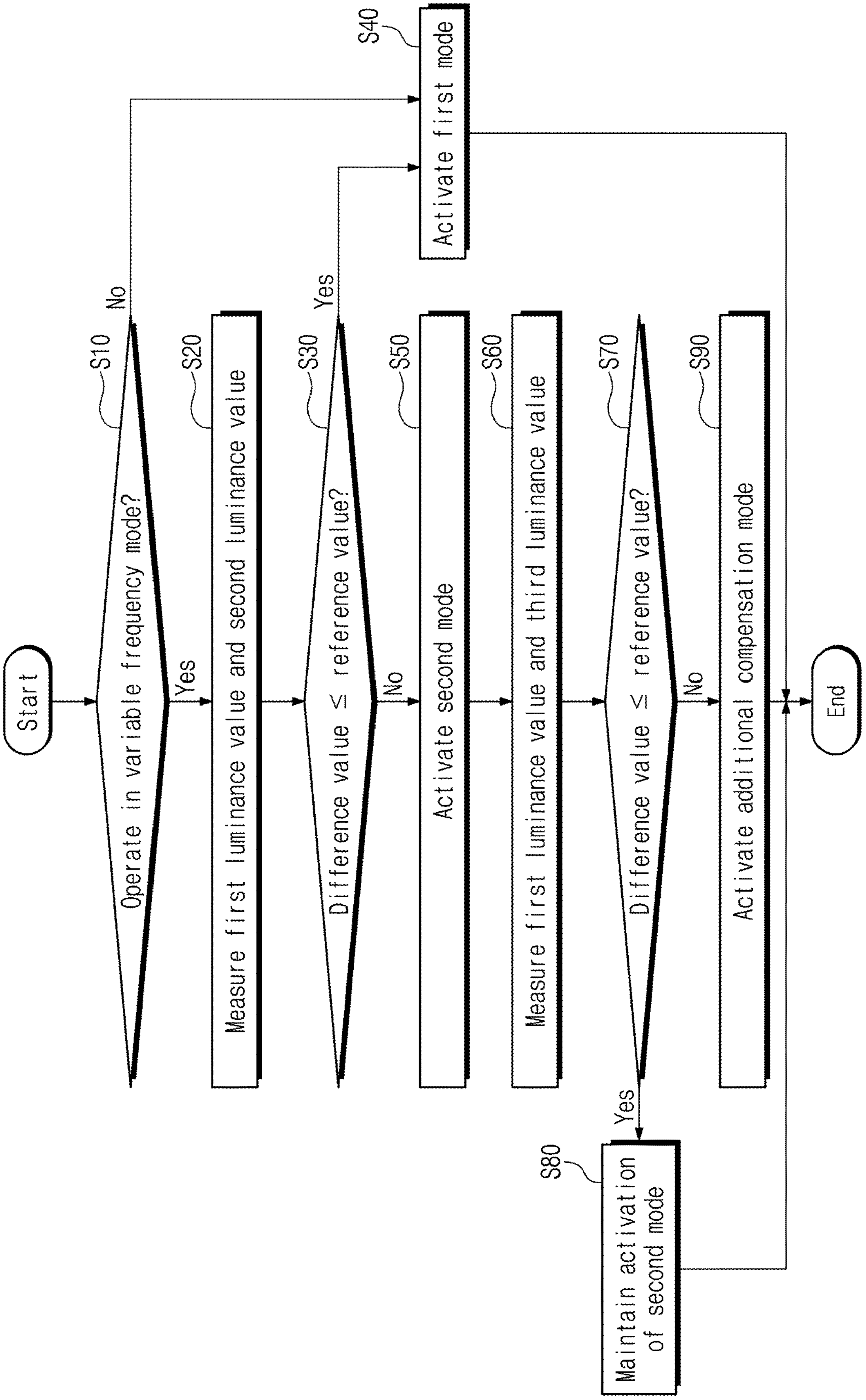

FIGS. 11A and 11B are flowcharts for describing a test process of a display device, according to embodiments of the present disclosure.

Referring to FIGS. 5A and 11A, a test device according to an embodiment of the present disclosure may determine whether a display device to be tested, hereinafter, a target display device, operates in a variable frequency mode in an operation S10. When the target display device operates in a variable frequency mode, the test device may operate the target display device at a predetermined first test frequency (or high frequency) and then may measure a luminance value, hereinafter referred to as a "first luminance value", for each grayscale of the target display device through a luminance measurement unit in an operation S20. Moreover, when the target display device operates in the variable frequency mode, the test device may operate the target display device at a predetermined second test frequency (or low frequency) and then may measure a luminance value, hereinafter referred to as a "second luminance value", for each grayscale of the target display device through the luminance measurement unit in the operation S20.

Afterward, a difference value between the first and second luminance values may be calculated, and the calculated difference value may be compared with a predetermined reference value in an operation S30. When the comparison result indicates that the difference value is less than or equal to the reference value, the first test frequency may not be selected as a compensation frequency. Accordingly, when the target display device operates at the first test frequency in the variable frequency mode, a first mode may be activated in an operation S40.

In the meantime, when the comparison result indicates that the difference value is greater than the reference value, the first test frequency may be selected as the compensation frequency and may be stored in the compensation table 130. Accordingly, when the target display device operates at the first test frequency in the variable frequency mode, a second mode may be activated in an operation S50.

The test device repeats this test process while changing the first test frequency. The test device may select the first test frequency corresponding to a case where the difference value is greater than the reference value as the compensation frequency and may store the first test frequency in the compensation table 130. As the compensation table 130 completed through this process is embedded in the driving controller 100, the display device DD, e.g., see FIG. 1, may operate in a first mode or a second mode depending on the operating frequency in the variable frequency mode.

Referring to FIGS. 5A and 11B, the test device according to an embodiment of the present disclosure may repeat a luminance measurement process again for the target display device activated in the second mode, hereinafter referred to as a default compensation mode. In detail, the test device may operate the target display device at a first test frequency (or a high frequency) and then may measure a luminance value, hereinafter referred to as a "first luminance value", for each grayscale of the target display device. In addition, the test device may operate the target display device at a second test frequency (or a lower frequency) and then may measure a luminance value, hereinafter referred to as a "third luminance value", for each grayscale of the target display device in an operation S60.

Afterward, a difference value between the first and third luminance values may be calculated, and the calculated difference value may be compared with a predetermined reference value in an operation S70. When the comparison result indicates that the difference value is less than or equal to the reference value, the first test frequency may be finally selected as a compensation frequency for operating in the default compensation mode. Accordingly, when the target display device operates at the first test frequency in the variable frequency mode, the activation of the default compensation mode may be maintained in an operation S80. In the meantime, when the comparison result indicates that the difference value is greater than the reference value, the first test frequency may be selected as an additional compensation frequency and may be stored in the compensation table 130. Accordingly, when the target display device operates at the first test frequency in the variable frequency mode, an additional compensation mode may be activated in an operation S90. In the additional compensation mode, the first scan circuit 310, e.g., see FIG. 5B, may generate a compensation initialization scan signal in a method different from a method in the default compensation mode. For example, in the default compensation mode, the first scan circuit 310 may output the compensation initialization scan signal C_GIj shown in FIG. 4B. In the additional compensation mode, the first scan circuit 310 may output the compensation initialization scan signal Ca_GIj shown in FIG. 9A or the compensation initialization scan signal Cb_GIj shown in FIG. 10A. In the case of operating in additional compensation mode, the on-bias amount of the first transistor T1, e.g., see FIG. 2A, is further reduced than in the default compensation mode, and thus the amount of current of the light emitting element ED, e.g., see FIG. 2A, may be further increased during high-frequency driving. Accordingly, a small luminance difference occurs between high-frequency driving and low-frequency driving, and thus the luminance uniformity of the display device DD may be improved.

Although not shown in drawings, the test device may repeat the luminance measurement process again for the target display device activated in the additional compensation mode.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to an embodiment of the present disclosure, issues of lowering the luminance uniformity of a display device due to the small luminance difference between high-frequency driving and low-frequency driving in a variable frequency mode may be solved or reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a pixel;

a scan driver configured to provide the pixel with a first mode scan signal having a first active period and a second active period in a first mode and to provide the pixel with a second mode scan signal having a compensation active period in a second mode; and a driving controller configured to control driving of the scan driver, wherein the driving controller is configured to:

determine whether an operating frequency of the display device corresponds to one of predetermined compensation frequencies in a variable frequency mode; and operate the scan driver in the first mode or the second mode depending on a determination result of the determining.

2. The display device of claim 1, wherein the pixel further includes:

a light emitting element;

a first transistor connected between the light emitting element and a driving voltage line and configured to operate depending on a potential of a first node;

a second transistor connected between a second node and a data line and configured to receive a write scan signal;

a third transistor connected between the first node and the first transistor and configured to receive a compensation scan signal;

a first capacitor connected between the first node and the second node;

a fourth transistor connected between the first node and an initialization voltage line and configured to receive the first mode scan signal or the second mode scan signal; and a fifth transistor connected between the second node and a reference voltage line and configured to receive the compensation scan signal.

3. The display device of claim 2, wherein, in the first mode, the first mode scan signal includes the first active period and the second active period, which are activated within a non-emission period of the light emitting element during a first frame, wherein the compensation scan signal includes a third active period and a fourth active period, which are activated within the non-emission period during the first frame, wherein the first active period precedes the third active period, wherein the second active period precedes the fourth active period, and wherein the first active period and the second active period do not overlap the third active period and the fourth active period.

4. The display device of claim 3, wherein, in the second mode, the second mode scan signal includes the compensation active period activated within the non-emission period during a second frame, wherein the compensation scan signal includes the third active period and the fourth active period, which are activated within the non-emission period during the second frame, and wherein the compensation active period is positioned between the third active period and the fourth active period.

5. The display device of claim 4, wherein the compensation active period has a duration smaller than or equal to a duration of the second active period.

6. The display device of claim 3, wherein, in the second mode, the compensation active period of the second mode scan signal includes a first compensation active period and a second compensation active period, which are activated within the non-emission period during a second frame, wherein the compensation scan signal includes the third active period and the fourth active period, which are activated within the non-emission period during the second frame, and wherein at least one of the first compensation active period and the second compensation active period has a duration smaller than a duration of each of the first active period and the second active period.

7. The display device of claim 6, wherein the duration of each of the first compensation active period and the second compensation active period is smaller than a duration of each of the third active period and the fourth active period.

8. The display device of claim 7, wherein the duration of each of the first active period and the second active period is equal to a duration of each of the third active period and the fourth active period.

9. The display device of claim 6, wherein the first compensation active period precedes the third active period within the second frame, wherein the second compensation active period precedes the fourth active period within the second frame, and wherein the first compensation active period and the second compensation active period do not overlap the third active period and the fourth active period.

10. The display device of claim 1, wherein the scan driver is configured to:

receive a start signal and a plurality of clock signals in the first mode; and receive a compensation start signal and the plurality of clock signals in the second mode, wherein the start signal has a first start active period, wherein the compensation start signal has a second start active period, and wherein the second start active period has a duration smaller than a duration of the first start active period.

11. The display device of claim 1, wherein the scan driver is configured to:

receive a plurality of clock signals in the first mode; and receive a plurality of compensation clock signals in the second mode, wherein each of the plurality of clock signals has a clock active period, wherein each of the plurality of compensation clock signals has a compensation clock active period, and wherein the compensation clock active period has a duration smaller than a duration of the clock active period.

12. The display device of claim 1, wherein the scan driver is configured to:

receive a start signal and a plurality of clock signals in the first mode; and receive a compensation start signal and the plurality of compensation clock signals in the second mode, wherein the start signal has a first start active period, wherein the compensation start signal has a second start active period, and wherein the second start active period has a duration smaller than a duration of the first start active period, wherein each of the plurality of clock signals has a clock active period, wherein each of the plurality of compensation clock signals has a compensation clock active period, and wherein the compensation clock active period has a duration smaller than a duration of the clock active period.

13. The display device of claim 1, wherein the driving controller includes:

a mode determinator configured to receive a mode enable signal, determine one mode, in which the display device operates, from among a normal frequency mode, in which the operating frequency is not varied, and the variable frequency mode, in which the operating frequency is varied in response to the mode enable signal, and output a bias control signal activated in the variable frequency mode; and a bias controller configured to be connected to the mode determinator to receive the bias control signal, to determine whether the operating frequency corresponds to one of the predetermined compensation frequencies in the variable frequency mode in response to the bias control signal, and to allow the scan driver to operate in one of the first mode and the second mode depending on the determination result.

14. The display device of claim 13, wherein the bias controller is configured to:

when the operating frequency does not correspond to one of the predetermined compensation frequencies, output a normal scan control signal for operating the scan driver in the first mode; and when the operating frequency corresponds to one of the predetermined compensation frequencies, output a compensation scan control signal for operating the scan driver in the second mode.

15. The display device of claim 14, wherein the normal scan control signal includes a start signal and a plurality of clock signals, wherein the compensation scan control signal includes a compensation start signal and the plurality of clock signals, wherein the start signal has a first start active period, wherein the compensation start signal has a second start active period, and wherein the second start active period has a duration smaller than a duration of the first start active period.

16. The display device of claim 14, wherein the normal scan control signal includes a start signal and a plurality of clock signals, wherein the compensation scan control signal includes the start signal and a plurality of compensation clock signals, wherein each of the plurality of clock signals has a clock active period, wherein each of the plurality of compensation clock signals has a compensation clock active period, and wherein the compensation clock active period has a duration smaller than a duration of the clock active period.

17. The display device of claim 14, wherein the normal scan control signal includes a start signal and a plurality of clock signals, wherein the compensation scan control signal includes a compensation start signal and a plurality of compensation clock signals, wherein the start signal has a first start active period, wherein the compensation start signal has a second start active period, and wherein the second start active period has a duration smaller than a duration of the first start active period, wherein each of the plurality of clock signals has a clock active period, wherein each of the plurality of compensation clock signals has a compensation clock active period, and wherein the compensation clock active period has a duration smaller than a duration of the clock active period.

18. The display device of claim 13, wherein the driving controller further includes:

a compensation table in which the predetermined compensation frequencies are stored, and wherein the bias controller determines whether the operating frequency corresponds to one of the predetermined compensation frequencies, with reference to the compensation table.

19. The display device of claim 18, wherein the second mode is one of a default compensation mode and an additional compensation mode, and wherein one of the default compensation mode and the additional compensation mode is set as the second mode for each of the predetermined compensation frequencies in the compensation table.

20. The display device of claim 19, wherein the compensation active period of the second mode scan signal in the additional compensation mode has a different form from a form of the compensation active period of the second mode scan signal in the default compensation mode.

* * * * *